(12) United States Patent
Hu et al.

(10) Patent No.: US 11,683,730 B2
(45) Date of Patent: Jun. 20, 2023

(54) HANDOVER METHOD AND BASE STATION

(71) Applicant: HUAWEI TECHNOLOGIES CO., LTD., Guangdong (CN)

(72) Inventors: Xingxing Hu, Shanghai (CN); Hongping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 17/215,937

(22) Filed: Mar. 29, 2021

(65) Prior Publication Data

US 2021/0219191 A1 Jul. 15, 2021

Related U.S. Application Data

(63) Continuation of application No. PCT/CN2019/108545, filed on Sep. 27, 2019.

(30) Foreign Application Priority Data

Sep. 28, 2018 (CN) .......................... 201811142682.4

(51) Int. Cl.
*H04W 36/08* (2009.01)
*H04W 36/00* (2009.01)
*H04W 76/12* (2018.01)

(52) U.S. Cl.
CPC ....... *H04W 36/0033* (2013.01); *H04W 36/08* (2013.01); *H04W 76/12* (2018.02)

(58) Field of Classification Search
CPC .. H04W 36/0033; H04W 36/08; H04W 76/12
See application file for complete search history.

(56) References Cited

U.S. PATENT DOCUMENTS

2018/0270699 A1 9/2018 Babaei et al.
2018/0324631 A1 11/2018 Jheng et al.
(Continued)

FOREIGN PATENT DOCUMENTS

CN 107302777 A 10/2017
CN 108156640 A 6/2018
(Continued)

OTHER PUBLICATIONS

Catt, "QoS flow to DRB remapping," 3GPP TSG-RAN WG3 NR AdHoc 1807, R3-183919, Montreal, Canada, Jul. 2-6, 2018, 3 pages.
(Continued)

*Primary Examiner* — Barry W Taylor
(74) *Attorney, Agent, or Firm* — Fish & Richardson P.C.

(57) ABSTRACT

This disclosure discloses methods, apparatuses, and systems for performing handover. One method comprises: receiving, by a target access network device after a mapping relationship between a quality of service (QoS) flow of a terminal device and a data radio bearer (DRB) changes, a handover request from a source access network device, wherein the handover request comprises indication information for requesting to establish a tunnel; and sending, by the target access network device to the source access network device, information about the tunnel for the target access network device to receive one or more data units from the source access network device after the mapping relationship between the QoS flow and the DRB changes.

17 Claims, 15 Drawing Sheets

(56) References Cited

U.S. PATENT DOCUMENTS

| | | | | |
|---|---|---|---|---|
| 2019/0349803 | A1* | 11/2019 | Byun | H04W 76/12 |
| 2019/0357086 | A1* | 11/2019 | Palat | H04W 76/27 |
| 2020/0015116 | A1* | 1/2020 | Huang | H04W 36/00 |
| 2020/0128452 | A1* | 4/2020 | Centonza | H04W 36/0044 |
| 2020/0280871 | A1* | 9/2020 | Khirallah | H04W 28/0257 |
| 2021/0400521 | A1* | 12/2021 | Fiorani | H04W 36/0005 |

FOREIGN PATENT DOCUMENTS

| | | |
|---|---|---|
| CN | 108366391 A | 8/2018 |
| CN | 108390830 A | 8/2018 |
| CN | 108496318 A | 9/2018 |
| CN | 108521890 A | 9/2018 |
| WO | 2018062949 A1 | 4/2018 |
| WO | 2018082602 A1 | 5/2018 |
| WO | 2018111029 A1 | 6/2018 |
| WO | 2018128462 A1 | 7/2018 |
| WO | 2018130968 A1 | 7/2018 |
| WO | 2018156696 A1 | 8/2018 |
| WO | 2018174420 A1 | 9/2018 |

OTHER PUBLICATIONS

3GPP TS 38.423 V15.1 0 (Sep. 2018), "3rd Generation Partnership Project; Technical Specification Group Radio Access Network; NG-RAN; Xn application protocol (XnAP) (Release 15)," Sep. 2018, 263 pages.

Vivo, "Discussion on supporting delta configuration and TP for inter-RAT mobility," 3GPP TSG-RAN WG2 Meeting #102, R2-1807613, Busan, Korea, May 21-25, 2018, 4 pages.

3GPP TS 38.300 V15.3.0 (Sep. 2018), "3rd Generation Partnership Project; Technical Specification Group Radio Access Network; NR; NR and NG-RAN Overall Description; Stage 2 (Release 15)," Sep. 2018, 92 pages.

Huawei, "Data forwarding with QoS flow relocation," 3GPP TSG-RAN3 Meeting #95bis, R3-171072, Spokane, Washington, USA, Apr. 3-7, 2017, 6 pages.

3GPP TS 37.324 V15.1.0 (Sep. 2018), "3rd Generation Partnership Project; Technical Specification Group Radio Access Network; E-UTRA and NR; Service Data Adaptation Protocol (SDAP) specification (Release 15)," Sep. 2018, 13 pages.

Office Action in Chinese Application No. 201811142682.4, dated Apr. 8, 2021, 6 pages.

Office Action in Chinese Application No. 201811142682.4, dated Aug. 3, 2020, 11 pages.

Office Action in Chinese Application No. 202010042836.3, dated Oct. 10, 2020, 13 pages.

International Search Report and Written Opinion in International Application No. PCT/CN2019/108545, dated Dec. 31, 2019, 13 pages.

Huawei, "Discussion on data forwarding and QoS flow remapping," 3GPP TSG-RAN3 Meeting #101-bis, R3-185817, Chengdu, China, Oct. 8-12, 2018, 2 pages.

Extended European Search Report issued in European Application No. 19864117.7 dated Oct. 15, 2021, 14 pages.

* cited by examiner

HANDOVER METHOD AND BASE STATION

CROSS-REFERENCE TO RELATED APPLICATIONS

This application is a continuation of International Application No. PCT/CN2019/108545, filed on Sep. 27, 2019, which claims priority to Chinese Patent Application No. 201811142682.4, filed on Sep. 28, 2018. The disclosures of the aforementioned applications are hereby incorporated by reference in their entireties.

TECHNICAL FIELD

This application relates to the communications field, and in particular, to a handover method and a base station.

BACKGROUND

In a 5G scenario, for each UE, a 5th generation core network (5 generation core, 5GC) device establishes one or more protocol data unit sessions (protocol data unit session, PDU session) for the UE. In addition, a 5G radio access network (NG-RAN) establishes one or more data radio bearers (data radio bearer, DRB) for each PDU session. A DRB is a data bearer between a base station and a terminal, and data on the data bearer has same forwarding processing. A quality of service flow (quality of Service flow, QoS flow) has a same quality of service (quality of Service, QoS) requirement in the PDU session. A user plane function (user plane function, UPF) of a core network device generates a downlink QoS flow, and the terminal generates an uplink QoS flow. There is a mapping relationship between a QoS flow and a DRB, and the mapping relationship may be configured by the base station. A plurality of QoS flows in a same PDU session may be mapped to a same DRB, to obtain same forwarding processing. However, QoS flows in different PDU sessions cannot be mapped to a same DRB.

A service data adaptation protocol (service data adaptation protocol, SDAP) layer is responsible for mapping a QoS flow from a non-access stratum to a DRB at an access stratum. For uplink data, the base station preferentially submits, to the core network device, a data unit that is first received in the QoS flow. For downlink data, the base station preferentially submits, to the UE, a data unit that is first received in the QoS flow. In this communications architecture, how to ensure normal communication during a handover is a problem worth considering.

SUMMARY

This application discloses a handover method, to ensure normal communication.

A first aspect of this application provides a handover method, including:

A target base station receives a base station handover request sent by a source base station, where the handover request carries first indication information, and the first indication information may be used to indicate that a data radio bearer DRB corresponding to a quality of service flow QoS flow of the source base station changes from a first DRB to a second DRB, and that a DRB corresponding to a QoS flow changes from a first DRB to a second DRB indicates that the QoS flow changes from being mapped to the first DRB for transmission to being mapped to the second DRB for transmission.

After receiving the handover request, the target base station may learn that the QoS flow of the source base station needs to be transferred to the target base station, and the DRB corresponding to the QoS flow changes.

The target base station sends information about a tunnel to the source base station, so that the source base station sends, to the target base station through the tunnel, a data unit obtained after the DRB corresponding to the QoS flow changes to the second DRB. The data unit is buffered at an SDAP layer of the source base station due to a mapping relationship change.

In this embodiment, the data unit obtained after the DRB corresponding to the QoS flow changes to the second DRB is a data unit that is transmitted by using the second DRB and that is in the QoS flow.

This embodiment of this application has the following advantages: The target base station receives the handover request sent by the source base station, where the handover request includes the first indication information, and may be used to indicate that the DRB corresponding to the QoS flow received by the source base station changes from the first DRB to the second DRB. Then, the target base station sends the information about the tunnel to the source base station, so that the source base station sends, through the tunnel, the data unit obtained after the corresponding DRB changes to the second DRB. In this embodiment, the source base station sends the handover request including the first indication information, and the target base station may determine, based on the first indication information, that the DRB corresponding to the QoS flow to which the data unit belongs changes from the first DRB to the second DRB, so that the target base station sends the information about the tunnel to the source base station, and the source base station transfers the data unit through the tunnel, to ensure that data units in the QoS flow are reported in sequence, thereby ensuring normal communication of a communications system.

With reference to the first aspect, in a first implementation of the first aspect, that the first indication information is used to indicate that a data radio bearer DRB corresponding to a QoS flow received by the source base station changes from a first DRB to a second DRB includes:

For uplink data, UE sends a QoS flow changing from being mapped to the first DRB to being mapped to the DRB 2 to the source base station. In addition, due to a mapping relationship change, after the SDAP layer of the source base station receives data units of the QoS flow on the second DRB, these data units are buffered at the SDAP layer of the source base station.

For downlink data, the source base station sends a QoS flow changing from being mapped to a DRB 1 to being mapped to a DRB 2 to UE. In addition, due to a mapping relationship change, the source base station buffers, at the SDAP layer of the source base station, a data unit of the QoS flow that needs to be sent by using the DRB 2.

With reference to any one of the first aspect and the first implementation of the first aspect, in a second implementation of the first aspect, the method further includes:

obtaining, by the target base station, an end indication, where the end indication is used to indicate an SDAP entity of the UE to stop mapping the QoS flow to the first DRB.

A manner in which the target base station obtains the end indication is as follows: In one case, due to impact of a wireless communication channel change, some data packets in a first data unit sent by the UE to the source base station are not correctly received by the source base station, and the source base station can transfer only the received data packets and the end indication to the target base station. In addition, the UE continues to resend, by using the first DRB, the data packets that are not correctly received by the source base station. When sending the data packets, the UE further resends the end indication to the target base station by using the first DRB. In the other case, the source base station entirely receives a first data unit, and the source base station sends the first data unit and the end indication to the target base station.

For the uplink data, when an SDAP layer of the target base station receives the end indication, the target base station learns, based on the indication information, that all data units transmitted by using the first DRB have been received, and may further learn that the first data unit has been submitted to a core network device. Then, the target base station sends a second data unit to the core network device.

In this embodiment, for the uplink data, after receiving the end indication, the target base station sends the data unit to the core network device, to ensure that the data units in the QoS flow are submitted in sequence.

With reference to any one of the first aspect and the first implementation of the first aspect, in a third implementation of the first aspect, the method further includes:

For the downlink data, after the target base station determines that the QoS flow mapped to the first DRB is received by the UE, the target base station maps the data unit to the second DRB, so as to send the data unit to the UE.

A determining manner may be that when determining that there is no QoS flow on the first DRB, the target base station may determine that the QoS flow mapped to the first DRB is received by the UE.

In this embodiment, for the downlink data, after the QoS flow mapped to the first DRB is received by the UE, the target base station sends the data unit to the UE, to ensure that the data units in the QoS flow are submitted in sequence.

With reference to any one of the first aspect and the first to the third implementations of the first aspect, in a fourth implementation of the first aspect, when the tunnel is a PDU session tunnel, the information about the tunnel includes an identifier of a protocol data unit PDU session corresponding to the QoS flow, so that the source base station determines, based on the information about the tunnel, information about a tunnel of a specific PDU session.

In this embodiment, the information about the tunnel includes the identifier of the PDU session, so that the source base station determines, based on the information about the tunnel, the information about the tunnel of the specific PDU session.

With reference to the fourth implementation of the first aspect, in a fifth implementation of the first aspect, the method further includes:

If the tunnel is the PDU session tunnel, when receiving the data unit transferred by the source base station, the target base station further needs to receive second indication information sent by the source base station, so that the target base station learns, based on the second indication information, that the transferred data unit is a data unit buffered at the SDAP layer, to distinguish the transferred data unit from another data unit that is not buffered at the SDAP layer.

In this embodiment, when the tunnel is the PDU session tunnel, the source base station may further send the second indication information to indicate that the data unit is the data unit buffered at the SDAP layer, to facilitate solution implementation.

With reference to any one of the first aspect and the first to the fourth implementations of the first aspect, in a sixth implementation of the first aspect, before that the target base station sends information about a tunnel to the source base station, the method further includes: allocating, by the target base station, an address to the tunnel.

In this embodiment, the target base station allocates the address to the tunnel, thereby increasing solution integrity.

With reference to any one of the first aspect and the first to the third implementations of the first aspect, in a seventh implementation of the first aspect, after that a target base station receives a handover request sent by a source base station, the method further includes:

If the tunnel is a DRB tunnel, when receiving the data unit transferred by the source base station, the target base station further needs to receive sequence number status transfer information sent by the source base station, where the sequence number status transfer information includes a PDCP SN number of the data unit.

In this embodiment, for the DRB tunnel, the source base station further sends the sequence number status transfer information of the data unit to the target base station, thereby increasing solution feasibility.

With reference to the seventh implementation of the first aspect, in an eighth implementation of the first aspect, the SN number of the data unit is used by the target base station to determine that the data unit is the data unit buffered at the SDAP layer of the source base station, and a determining manner is that the target base station indicates, by using a bit string of the PDCP SN number, whether a data unit before a PDCP SN number corresponding to the first lost uplink PDCP SDU on a DRB corresponding to the DRB tunnel is a data unit buffered at the SDAP layer.

In this embodiment, the sequence number status transfer information includes the PDCP SN number that may be used to indicate that the data unit is the data unit buffered at the SDAP layer, to facilitate solution implementation.

A second aspect of this application provides a handover method, including:

A source base station sends a base station handover request to a target base station, where the handover request carries first indication information, and the first indication information may be used to indicate that a data radio bearer DRB corresponding to a quality of service flow QoS flow of the source base station changes from a first DRB to a second DRB, so that the target base station can learn, based on the first indication information, that a mapping relationship between the QoS flow and the DRB changes, and therefore can learn that the buffered QoS flow at an SDAP layer of the source base station needs to be transferred to the target base station.

That a DRB corresponding to a QoS flow changes from a first DRB to a second DRB indicates that the QoS flow changes from being mapped to the first DRB for transmission to being mapped to the second DRB for transmission.

The source base station receives information about a tunnel sent by the target base station.

The source base station sends, to the target base station through the tunnel, a data unit obtained after the DRB corresponding to the QoS flow changes to the second DRB. The data unit is buffered at the SDAP layer of the source base station due to a mapping relationship change. In this embodiment, the data unit obtained after the DRB corresponding to the QoS flow changes to the second DRB is a data unit that is transmitted by using the second DRB and that is in the QoS flow.

In this embodiment, the source base station sends the handover request including the first indication information, and the target base station may determine, based on the first indication information, that the DRB corresponding to the QoS flow to which the data unit belongs changes from the first DRB to the second DRB, so that the target base station sends the information about the tunnel to the source base station, and the source base station transfers the data unit through the tunnel, to ensure that data units in the QoS flow are reported in sequence, thereby ensuring normal communication of a communications system.

With reference to the second aspect, in a first implementation of the second aspect, that the first indication information is used to indicate that a data radio bearer DRB corresponding to a QoS flow received by the source base station changes from a first DRB to a second DRB includes:

For uplink data, UE sends a QoS flow changing from being mapped to the first DRB to being mapped to the DRB 2 to the source base station. In addition, due to a mapping relationship change, after the SDAP layer of the source base station receives data units of the QoS flow on the second DRB, these data units are buffered at the SDAP layer of the source base station.

For downlink data, the source base station sends a QoS flow changing from being mapped to the DRB 1 to being mapped to the DRB 2 to UE. In addition, due to a mapping relationship change, the source base station buffers, at the SDAP layer of the source base station, a data unit of the QoS flow that needs to be sent by using the DRB 2.

In this embodiment, a meaning that the DRB corresponding to the QoS flow in each of the uplink data and the downlink data changes from the first DRB to the second DRB is described, to facilitate solution implementation.

With reference to any one of the second aspect and the first implementation of the second aspect, in a second implementation of the second aspect, when the tunnel is a PDU session tunnel, the information about the tunnel includes an identifier of a protocol data unit PDU session corresponding to the QoS flow, so that the source base station determines, based on the information about the tunnel, information about a tunnel of a specific PDU session.

In this embodiment, the information about the tunnel includes the identifier of the PDU session, so that the source base station determines, based on the information about the tunnel, the information about the tunnel of the specific PDU session.

With reference to the second implementation of the second aspect, in a third implementation of the second aspect, after that the source base station receives information about a tunnel sent by the target base station, the method further includes:

If the tunnel is the PDU session tunnel, the source base station further needs to send second indication information to the target base station, so that the target base station learns, based on the second indication information, that the transferred data unit is a data unit buffered at the SDAP layer, to distinguish the transferred data unit from another data unit that is not buffered at the SDAP layer.

In this embodiment, when the tunnel is the PDU session tunnel, the source base station may further send the second indication information to indicate that the data unit is the data unit buffered at the SDAP layer, to facilitate solution implementation.

With reference to any one of the second aspect and the first implementation of the second aspect, in a fourth implementation of the second aspect, after that the source base station receives information about a tunnel sent by the target base station, the method further includes:

If the tunnel is a DRB tunnel, when the source base station transfers the data unit, the source base station further needs to send sequence number status transfer information to the target base station, where the sequence number status transfer information includes a PDCP SN number of the data unit.

In this embodiment, for the DRB tunnel, the source base station further sends the sequence number status transfer information of the data unit to the target base station, thereby increasing solution feasibility.

With reference to the fourth implementation of the second aspect, in a fifth implementation of the second aspect, the SN number of the data unit is used by the target base station to determine that the data unit is the data unit buffered at the SDAP layer of the source base station, and a determining manner is that the target base station indicates, by using a bit string of the PDCP SN number, whether a data unit before a PDCP SN number corresponding to the first lost uplink PDCP SDU in a DRB corresponding to the DRB tunnel is a data unit buffered at the SDAP layer.

In this embodiment, the sequence number status transfer information includes the PDCP SN number that may be used to indicate that the data unit is the data unit buffered at the SDAP layer, to facilitate solution implementation.

A third aspect of this application provides an encryption method, including:

sending, by a core network device, a selection indication to a source base station, where the selection indication is specifically an encryption preferred indication, and the encryption preferred indication is used to indicate that a base station determines whether to perform encryption:

encrypting or not encrypting, by the source base station, a QoS flow based on the selection indication;

sending, by the source base station, a handover request message to a target base station, where the handover request message is used to request to hand over some QoS flows in a PDU session to the target base station, the handover request message further carries a source base station operation indication, and the source base station operation indication is used to indicate that the source base station performs an encryption operation or does not perform an encryption operation and encrypting or not encrypting, by the target base station, the received some QoS flows based on the source base station operation indication.

Optionally, the source base station operation indication may include a selection indication and an information element, and the information element is used to indicate that the source base station encrypts a QoS flow or does not encrypt a QoS flow. Alternatively, the source base station operation indication may be an indication that encryption is required or an indication that encryption is not required, where the indication is obtained by the source base station by modifying, based on an operation of the source base station, the encryption indication sent by the core network device.

In this embodiment, if encrypting the QoS flow, the source base station sends the source base station operation indication to the target base station, so that the target base station can perform a corresponding encryption operation based on the operation indication, to ensure consistency of encryption operations performed by the source base station and the target base station.

A fourth aspect of this application provides an integrity protection method, including:

sending, by a core network device, a selection indication to a source base station, where the selection indication is specifically an integrity protection preferred indication, and the integrity protection preferred indication is used to indicate that a base station determines whether to perform integrity protection;

performing integrity protection or not performing integrity protection, by the source base station, on a QoS flow based on the selection indication;

sending, by the source base station, a handover request message to a target base station, where the handover request message is used to request to hand over some QoS flows in a PDU session to the target base station, the handover request message further carries a source base station operation indication, and the source base station operation indication is used to indicate that the source base station performs an integrity protection operation or does not perform an integrity protection operation; and performing integrity protection or not performing integrity protection, by the target base station, on the received QoS flows based on the source base station operation indication.

In this embodiment, the source base station operation indication may include a selection indication and an information element, and the information element is used to indicate the source base station performs integrity protection on a QoS flow or does not perform integrity protection on a QoS flow. Alternatively, the source base station operation indication may be an indication that integrity protection is required or an indication that integrity protection is not required, where the indication is obtained by the source base station by modifying, based on an operation of the source base station, the integrity protection indication sent by the core network device.

In this embodiment, if performing the integrity protection on the QoS flow, the source base station sends the source base station operation indication to the target base station, so that the target base station can perform a corresponding integrity protection operation based on the operation indication, to ensure consistency of integrity protection operations performed by the source base station and the target base station.

A fifth aspect of this application provides a key processing method, including:

receiving, by user equipment UE, a first count value sent by a master node MN, where the first count value is a count value of a secondary node counter SN counter in a first dual connectivity DC manner, the first count value is a positive integer greater than or equal to zero, and the first DC manner is a DC manner configured by the MN for the UE;

when the UE releases the first DC manner, reserving, by the UE, the first count value:

receiving, by the UE, a second count value sent by the MN, where the second count value is a count value of an SN counter in a second DC manner, the second count value is a positive integer greater than or equal to zero, and the second DC manner is a DC manner configured by the MN for the UE;

determining, by the UE based on the first count value, whether the second count value is abnormal; and when the second count value is abnormal, sending, by the UE, configuration failure identification information to the MN.

In this embodiment, the UE determines, by using the first count value, whether the second count value is abnormal. If the MN configures a same count value, the UE sends the configuration failure identification information to the MN, to avoid a case in which the MN derives a same S-key in different DC manners. This ensures communications security over an air interface.

A sixth aspect of this application provides a key processing method, including:

sending, by the master node MN, a first count value to user equipment UE, where the first count value is a count value of a secondary node counter SN counter in a first dual connectivity DC manner, the first count value is a positive integer greater than or equal to zero, and the first DC manner is a DC manner configured by the MN for the UE;

sending, by the MN, a second count value to the UE, where the second count value is used by the UE to determine, based on the first count value reserved when the UE releases the first DC manner, whether the second count value is abnormal, the second count value is a count value of an SN counter in a second DC manner, the second count value is a positive integer greater than or equal to zero, and the second DC manner is a DC manner configured by the MN for the UE; and when the second count value is abnormal, receiving, by the MN, configuration failure identification information sent by the MN.

In this embodiment, the MN sends the first count value to the UE. After the MN sends the second count value to the UE, the UE may determine, based on the first count value, whether the second count value is abnormal, so that the UE sends the configuration failure identification information to the MN, to avoid a case in which the MN derives a same S-key in different DC manners. This ensures communications security over an air interface.

A seventh aspect of this application provides a base station, including:

a receiving unit, configured to receive a handover request sent by a source base station, where the handover request includes first indication information, and the first indication information is used to indicate that a data radio bearer DRB corresponding to a quality of service flow QoS flow of the source base station changes from a first DRB to a second DRB; and a sending unit, configured to send information about a tunnel to the source base station, where the tunnel is used by the target base station to receive a data unit sent by the source base station, and the data unit is a data unit obtained after the DRB corresponding to the QoS flow changes to the second DRB.

With reference to the seventh aspect, in a first implementation of the seventh aspect, that the first indication information is used to indicate that a data radio bearer DRB corresponding to a QoS flow received by the source base station changes from a first DRB to a second DRB includes:

the first indication information is used to indicate that the QoS flow received by the source base station from user equipment UE changes from being mapped to the first DRB to being mapped to the second DRB, and the QoS flow is a QoS flow that is buffered at a service data adaptation protocol SDAP layer of the source base station because the corresponding DRB changes; or the first indication information is used to indicate that the QoS flow sent by the source base station to UE changes from being mapped to the first DRB to being mapped to the second DRB, and the QoS flow is a QoS flow that is buffered at an SDAP layer of the source base station because the corresponding DRB changes.

With reference to any one of the seventh aspect and the first implementation of the seventh aspect, in a second implementation of the seventh aspect, the receiving unit is further configured to: obtain an end indication, where the end indication is used to indicate an SDAP entity of the UE to stop mapping the QoS flow to the first DRB; and send the data unit to a core network device.

With reference to any one of the seventh aspect and the first implementation of the seventh aspect, in a third implementation of the seventh aspect, the sending unit is further configured to: after the QoS flow mapped to the first DRB is received by the UE, send the data unit to the UE by using the second DRB.

With reference to any one of the seventh aspect and the first to the third implementations of the seventh aspect, in a fourth implementation of the seventh aspect, the information about the tunnel includes an identifier of a protocol data unit PDU session corresponding to the QoS flow.

With reference to the fourth implementation of the seventh aspect, in a fifth implementation of the seventh aspect, the receiving unit is further configured to receive second indication information from the source base station, where the second indication information is used by the target base station to determine that the data unit is a data unit that is buffered at the SDAP layer of the source base station because the corresponding DRB changes.

With reference to any one of the seventh aspect and the first to the fourth implementations of the seventh aspect, in a sixth implementation of the seventh aspect, the base station further includes:

an address allocation unit, configured to allocate an address to the tunnel.

With reference to any one of the seventh aspect and the first to the third implementations of the seventh aspect, in a seventh implementation of the seventh aspect, the receiving unit is further configured to receive sequence number status transfer information from the source base station, where the sequence number status transfer information includes an SN number of the data unit.

With reference to the seventh implementation of the seventh aspect, in an eighth implementation of the seventh aspect, the SN number of the data unit is used by the target base station to determine that the data unit is a data unit that is buffered at the SDAP layer of the source base station because the corresponding DRB changes.

An eighth aspect of this application provides a base station, including:

a sending unit, configured to send a handover request to a target base station, where the handover request includes first indication information, and the first indication information is used to indicate that a data radio bearer DRB corresponding to a quality of service flow QoS flow of the source base station changes from a first DRB to a second DRB; and a receiving unit, configured to receive information about a tunnel sent by the target base station, where the sending unit is further configured to send a data unit to the target base station through the tunnel, where the data unit is a data unit obtained after the DRB corresponding to the QoS flow changes to the second DRB.

With reference to the eighth aspect, in a first implementation of the eighth aspect, that the first indication information is used to indicate that a data radio bearer DRB corresponding to a QoS flow received by the source base station changes from a first DRB to a second DRB includes:

the first indication information is used to indicate that the QoS flow received by the source base station from user equipment UE changes from being mapped to the first DRB to being mapped to the second DRB, and the QoS flow is a QoS flow that is buffered at a service data adaptation protocol SDAP layer of the source base station because the corresponding DRB changes; or the first indication information is used to indicate that the QoS flow sent by the source base station to UE changes from being mapped to the first DRB to being mapped to the second DRB, and the QoS flow is a QoS flow that is buffered at an SDAP layer of the source base station because the corresponding DRB changes.

With reference to any one of the eighth aspect and the first implementation of the eighth aspect, in a second implementation of the eighth aspect, the information about the tunnel includes an identifier of a protocol data unit PDU session corresponding to the QoS flow.

With reference to the second implementation of the eighth aspect, in a third implementation of the eighth aspect, the sending unit is further configured to send second indication information to the target base station, where the second indication information is used to indicate that the data unit is a data unit that is buffered at the SDAP layer of the source base station because the corresponding DRB changes.

With reference to any one of the eighth aspect and the first implementation of the eighth aspect, in a fourth implementation of the eighth aspect, the sending unit is further configured to send sequence number status transfer information to the target base station, where the sequence number transfer information includes an SN number of the data unit.

With reference to the fourth implementation of the eighth aspect, in a fifth implementation of the eighth aspect, the SN number of the data unit is used by the target base station to determine that the data unit is a data unit that is buffered at the SDAP layer of the source base station because the corresponding DRB changes.

A ninth aspect of this application provides a base station, including a memory, a transceiver, and a processor, where the memory is configured to store a program and an instruction;

the transceiver is configured to receive or send information under control of the processor;

the processor is configured to execute the program in the memory;

the bus system is configured to connect the memory, the transceiver, and the processor, so that the memory, the transceiver, and the processor communicate with each other; and the processor is configured to invoke the program instruction in the memory to perform the method according to any one of the first aspect, the first to the eighth implementations of the first aspect, the second aspect, and the first to the fifth implementations of the second aspect.

With reference to the ninth aspect, in a first implementation of the ninth aspect, the base station further includes the bus system; and the bus system is configured to connect the memory, the transceiver, and the processor, so that the memory, the transceiver, and the processor communicate with each other.

A tenth aspect of this application provides a computer-readable storage medium, including an instruction, where when the instruction is run on a computer, the computer is enabled to perform the method according to any one of the first aspect, the first to the eighth implementations of the first aspect, the second aspect, and the first to the fifth implementations of the second aspect.

An eleventh aspect of this application provides a computer program product that includes an instruction, where when the computer program product runs on a computer, the computer is enabled to perform the method according to any one of the first aspect, the first to the eighth implementations of the first aspect, the second aspect, and the first to the fifth implementations of the second aspect.

A twelfth aspect of this application provides a communications chip, where the communications chip stores an instruction, and when the communications chip runs on a communications apparatus, the communications chip is enabled to perform the method according to any one of the first aspect, the first to the eighth implementations of the first aspect, the second aspect, and the first to the fifth implementations of the second aspect.

A thirteenth aspect of this application provides a communications system, including the apparatus according to any one of the seventh aspect, the first to the eighth implementations of the seventh aspect, the eighth aspect, and the first to the fifth implementations of the eighth aspect.

DESCRIPTION OF EMBODIMENTS

Figure 1A:
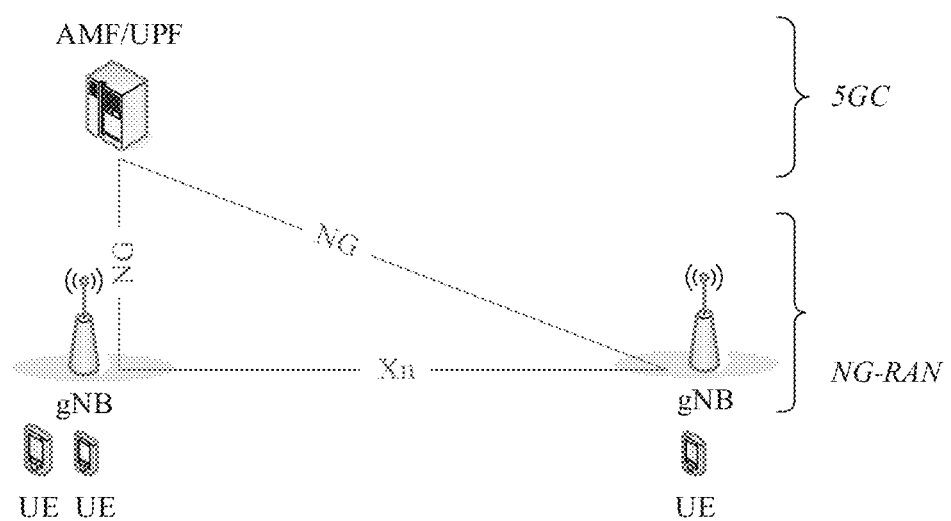
FIG. 1(a) is an architectural diagram of a 5G communications system according to this application.

A structure of a 5G communications system is shown in FIG. 1(a). The communications system may include a core network (5GC) and an access network (NG-RAN). The core network provides a function of a 5G core network for UE. The core network includes a core network control plane network element (access and mobility management function, AMF) function and a core network user plane network element (user plane function, UPF) function. The AMF is mainly responsible for access and mobility management of a terminal. The UPF is mainly responsible for functions such as routing and forwarding and quality of service (quality of service, QoS) management of a data packet.

The access network may include a base station, and provides a wireless access service for the UE. The base station may be a 5G new radio (new radio, NR) base station (gNB) connected to the NGC.

This application may be applied to the communications system shown in FIG. 1(a), or may be applied to another communications system. This is not limited in this application.

In the specification, claims, and accompanying drawings of this application, the terms "first", "second", "third", "fourth", and so on (if existent) are intended to distinguish between similar objects but do not necessarily indicate a specific order or sequence. It needs to be understood that the data termed in such a way are interchangeable in proper circumstances so that embodiments of this application described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

In the embodiments, a PDU session tunnel indicates a tunnel established for a PDU session, and a DRB tunnel indicates a tunnel established for each DRB.

Figure 1B:
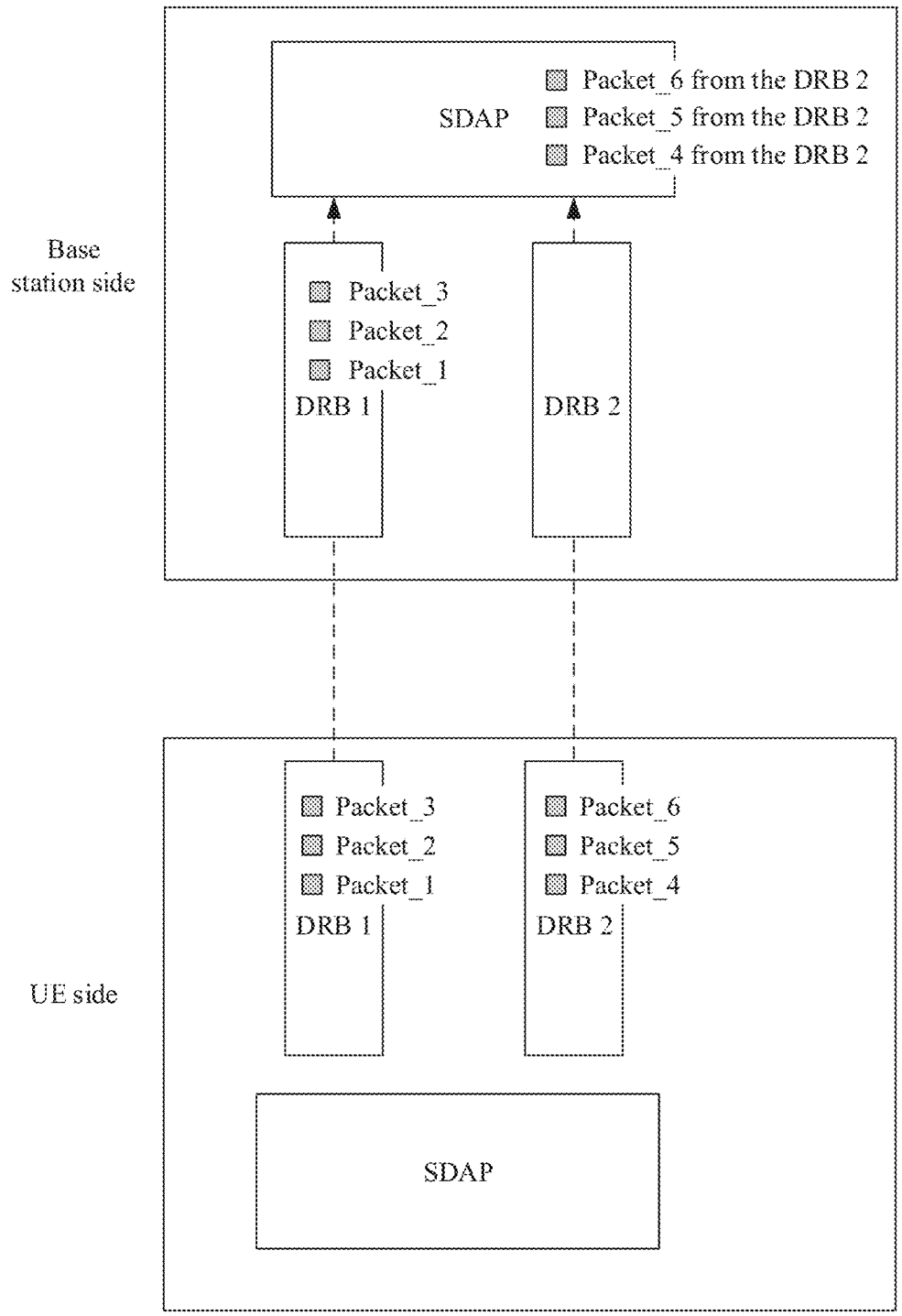
FIG. 1(b) is a schematic diagram of receiving an uplink data unit by an SDAP entity when a mapping relationship changes according to this application.

In the embodiments, for uplink data, a QoS flow of a source base station is a data flow received by the source base station from UE, and the uplink QoS flow is mapped by an SDAP entity of the UE to a DRB, so as to be sent to the source base station. There is a mapping relationship between the QoS flow and the DRB. If the mapping relationship changes in a process of mapping the QoS flow to the DRB, for example, the QoS flow changes from being mapped to a DRB 1 to being mapped to a DRB 2, a second data unit corresponding to the DRB 2 in the QoS flow may first reach the source base station, a first data unit corresponding to the DRB 1 in the QoS flow subsequently reaches the source base station, and an SDAP layer of the source base station buffers the second data unit that is of the QoS flow and that is received on the DRB 2. As shown in FIG. 1(b), in an uplink direction, an SDAP layer on a terminal side plans to map data units packet_1/2/3 and packet_4/5/6 of a QoS flow to a DRB 1. After the SDAP layer maps packet_1/2/3 to the DRB 1, in this case, if a mapping relationship between the QoS flow and a DRB changes to mapping a data unit of the QoS flow to the DRB 2, to be specific, the SDAP layer changes the data unit packet_4/5/6 in the QoS flow from being mapped to the DRB 1 to being mapped to the DRB 2, when the mapping relationship changes, data out-of-order may occur. For example, an SDAP layer of a base station may first receive packet_4/5/6 of the QoS flow on the DRB 2, but does not receive packet_1/2/3 on the DRB 1. In this case, the base station first submits the data unit that is preferentially received. Consequently, the data units are submitted out of order. In this application, to avoid out-of-order of the data units during a base station handover, a second data unit packet_4/5/6 may be reported to a core network device after a first data unit such as packet_1/2/3 has been reported to the core network device. Optionally, a manner in which the SDAP entity of the UE determines that the uplink QoS flow changes from the DRB 1 to the DRB 2 includes: The UE receives an RRC message of the source base station, and the message is used to notify the UE that the mapping relationship between the uplink QoS flow and the DRB changes. Alternatively, the UE receives a data packet of the base station, and the data packet carries indication information, to indicate, to the UE, that the mapping relationship between the uplink QoS flow and the DRB changes.

Figure 1C:
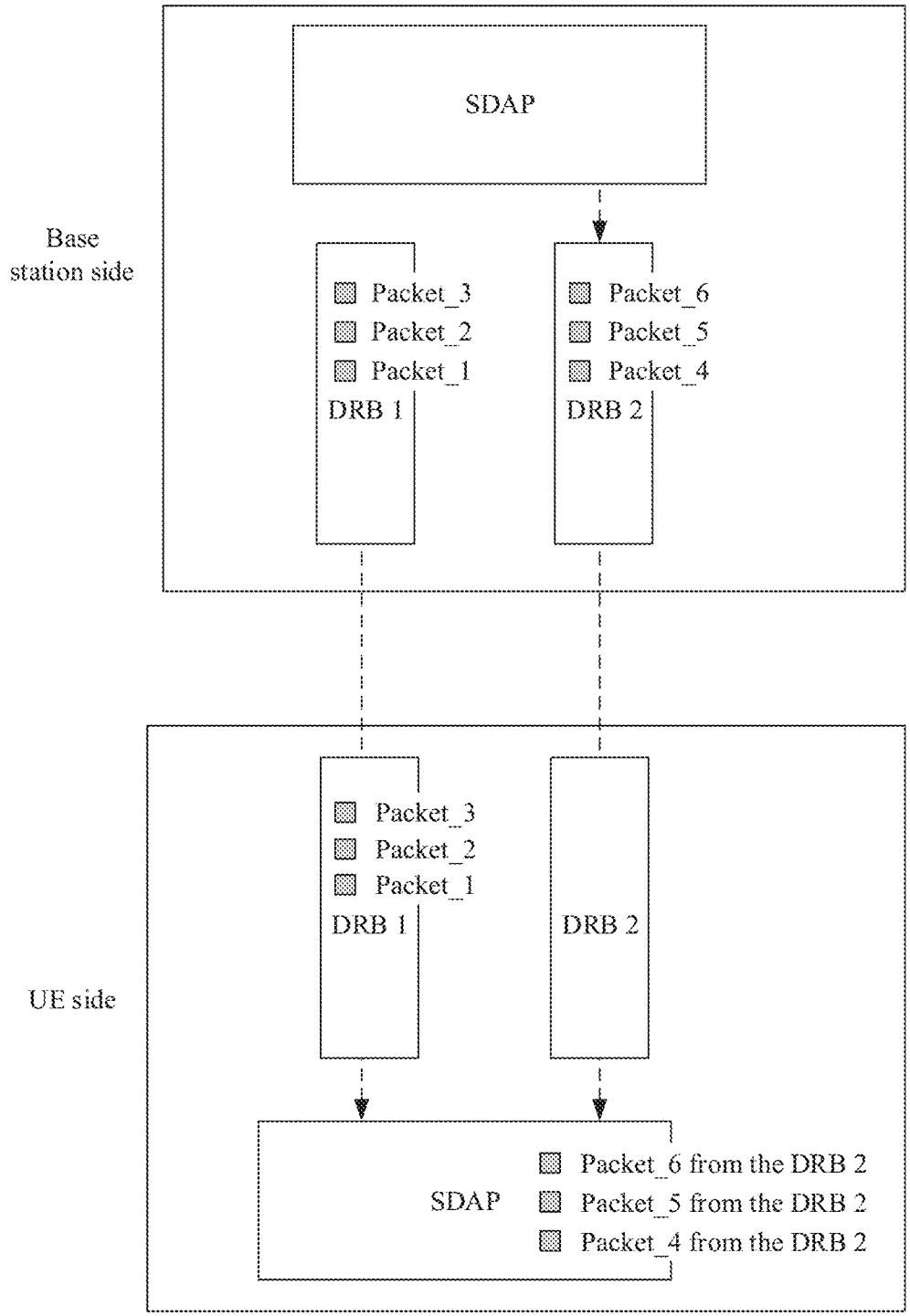
FIG. 1(c) is a schematic diagram of receiving a downlink data unit by an SDAP entity when a mapping relationship changes according to this application.

For downlink data, a QoS flow of the source base station is a data flow sent by the source base station to the UE, and the QoS flow is mapped by an SDAP entity of the source base station to a DRB, so as to be sent to the UE. There is a mapping relationship between the QoS flow and the DRB. As shown in FIG. 1(c), if the mapping relationship changes in a process of mapping the QoS flow to the DRB, for example, the QoS flow changes from being mapped to a DRB 1 to being mapped to a DRB 2, in the QoS flow, packet_4/5/6 mapped to the DRB 2 reaches the UE earlier than packet_1/2/3 mapped to the DRB 1. To ensure that data units of the QoS flow are submitted in sequence on a UE side, a first data unit is a data unit before a second data unit in the QoS flow, and the second data unit is first buffered at an SDAP layer of the source base station.

Figure 2:
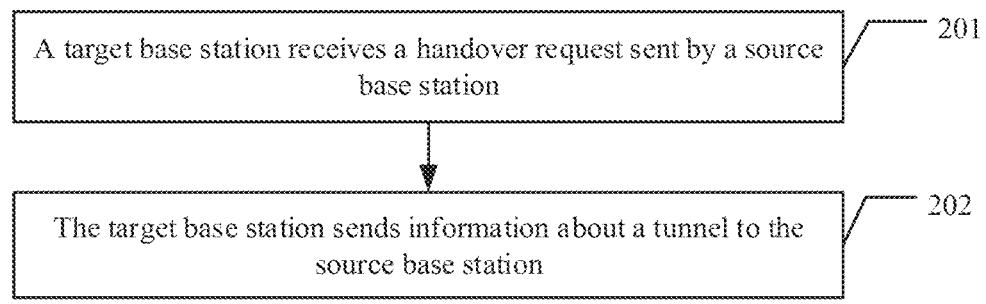
FIG. 2 is a schematic diagram of an embodiment of a handover method according to this application.

With reference to FIG. 2, a handover method in this application is described. The handover method may include the following steps.

201. A target base station receives a handover request sent by a source base station.

During a base station handover, the target base station first receives the handover request sent by the source base station. The handover request carries first indication information, and the first indication information is used to indicate that a data radio bearer DRB corresponding to a quality of service flow QoS flow of the source base station changes from a first DRB to a second DRB.

The source base station needs to notify the target base station of a mapping relationship between the corresponding QoS flow and a DRB, where the mapping relationship may be a mapping relationship after a mapping relationship change or may be a mapping relationship before a mapping relationship change, or may simultaneously notify the target base station of mapping relationships before and after a mapping relationship change. The mapping relationship may be distinguished for an uplink and a downlink.

In this embodiment, a specific form of the first indication information may be used to request to establish a PDU session tunnel or a DRB tunnel. The first indication information may also be distinguished for the uplink and the downlink. For example, the first indication information may be used to request to establish an uplink PDU session tunnel or an uplink DRB tunnel, or may be used to request to establish a downlink PDU session tunnel or a downlink DRB tunnel.

The first indication information may be used to indicate that uplink data or downlink data of the QoS flow buffered at an SDAP layer of the source base station needs to be processed. For example, the first indication information is used to indicate that the uplink data at the SDAP layer needs to be specially processed, or the downlink data needs to be specially processed, or both the uplink data and the downlink data need to be specially processed. Alternatively, the first indication information may be further used to indicate that the source base station has not completed, before the base station handover, remapping of the QoS flow. Alternatively, the first indication information may be further used to indicate that uplink data or downlink data is buffered at an SDAP layer of the source base station.

Optionally, the first indication information may be further distinguished into uplink indication information and downlink indication information, to be specific, used to indicate that a data radio bearer DRB corresponding to an uplink quality of service flow QoS flow of the source base station changes from the first DRB to the second DRB, and/or used to indicate that a data radio bearer DRB corresponding to a downlink quality of service flow QoS flow of the source base station changes from the first DRB to the second DRB.

In this embodiment, that the DRB corresponding to the QoS flow changes from the first DRB to the second DRB specifically indicates:

For the uplink data, the UE sends the QoS flow changing from being mapped to the first DRB to being mapped to the DRB 2 to the source base station. Due to a mapping relationship change, after the SDAP layer of the source base station receives data units of the QoS flow in the second DRB, these data units are buffered at the SDAP layer of the source base station. For the downlink data, the source base station sends the QoS flow changing from being mapped to the DRB 1 to being mapped to the DRB 2 to the UE. Due to a mapping relationship change, the source base station buffers, at the SDAP layer of the source base station, a data unit sent by using the second DRB.

202: The target base station sends information about a tunnel to the source base station.

The target base station determines that the mapping relationship between the QoS flow and the DRB changes, establishes the tunnel, allocates an address to the tunnel, and then sends the information about the tunnel to the source base station. The information about the tunnel includes a transport layer address and a GPRS tunnelling protocol tunnel endpoint identifier (GPRS tunnelling protocol tunnel endpoint ID, GTP-TEID) of the tunnel. Optionally, the information about the tunnel sent by the target base station may be distinguished for the uplink and the downlink, namely, information about an uplink tunnel and/or information about a downlink tunnel. The tunnel is established to transfer data buffered at the SDAP layer.

The target base station sends the information about the tunnel to the source base station, and the tunnel is used by the source base station to transfer a data unit obtained after the DRB corresponding to the QoS flow changes to the second DRB. The data unit belongs to the QoS flow, and is also buffered at the SDAP layer of the source base station. In this embodiment, the tunnel may be a PDU session tunnel, or may be a DRB tunnel. If the tunnel is the PDU session tunnel, the information about the tunnel includes an identifier of a protocol data unit PDU session corresponding to the QoS flow. The source base station may determine, based on the information about the tunnel, information about a tunnel of a specific PDU session. If the tunnel is the DRB tunnel, the information about the tunnel includes an identifier of a DRB corresponding to the QoS flow. The source base station may determine, based on the information about the tunnel, information about a tunnel of a specific DRB. If the tunnel is the DRB tunnel, the source base station may further send sequence number status transfer information to the target base station. The tunnel may be alternatively another type of tunnel, and is not specifically limited herein. For the uplink data, there is no PDU session tunnel. By establishing the PDU session tunnel, the base station handover may be synchronously implemented when the mapping relationship changes, and out-of-order of the data units does not occur. For the downlink data, there is the PDU session tunnel between base stations. In this application, the target base station may re-establish a PDU session tunnel to transfer the QoS flow. For both the uplink data and the downlink data, there is a DRB tunnel between base stations. In this application, the target base station may transfer the QoS flow by using an original DRB tunnel.

In this embodiment, the source base station sends the handover request including the first indication information, and the target base station may determine, based on the first indication information, that the DRB corresponding to the QoS flow to which the data unit belongs changes from the first DRB to the second DRB. The target base station sends the information about the tunnel to the source base station, and the source base station transfers the data unit through the tunnel, to ensure that data units in the QoS flow are reported in sequence, thereby ensuring normal communication.

Based on the handover method in FIG. 2, the tunnel in this embodiment may be the PDU session tunnel, or may be the DRB tunnel. The following separately provides descriptions.

First, it needs to be noted that in the following, a first data unit described in FIG. 3 to FIG. 6 is a data unit when a data radio bearer DRB corresponding to a QoS flow is a first DRB, and a second data unit is a data unit after the DRB corresponding to the QoS flow changes to a second DRB. The first data unit and the second data unit belong to a same QoS flow. Due to a mapping relationship change, the second data unit is buffered at an SDAP layer of a source base station. In a time sequence, the first data unit is a data unit before the second data unit.

1. A tunnel is a PDU session tunnel.

Figure 3:
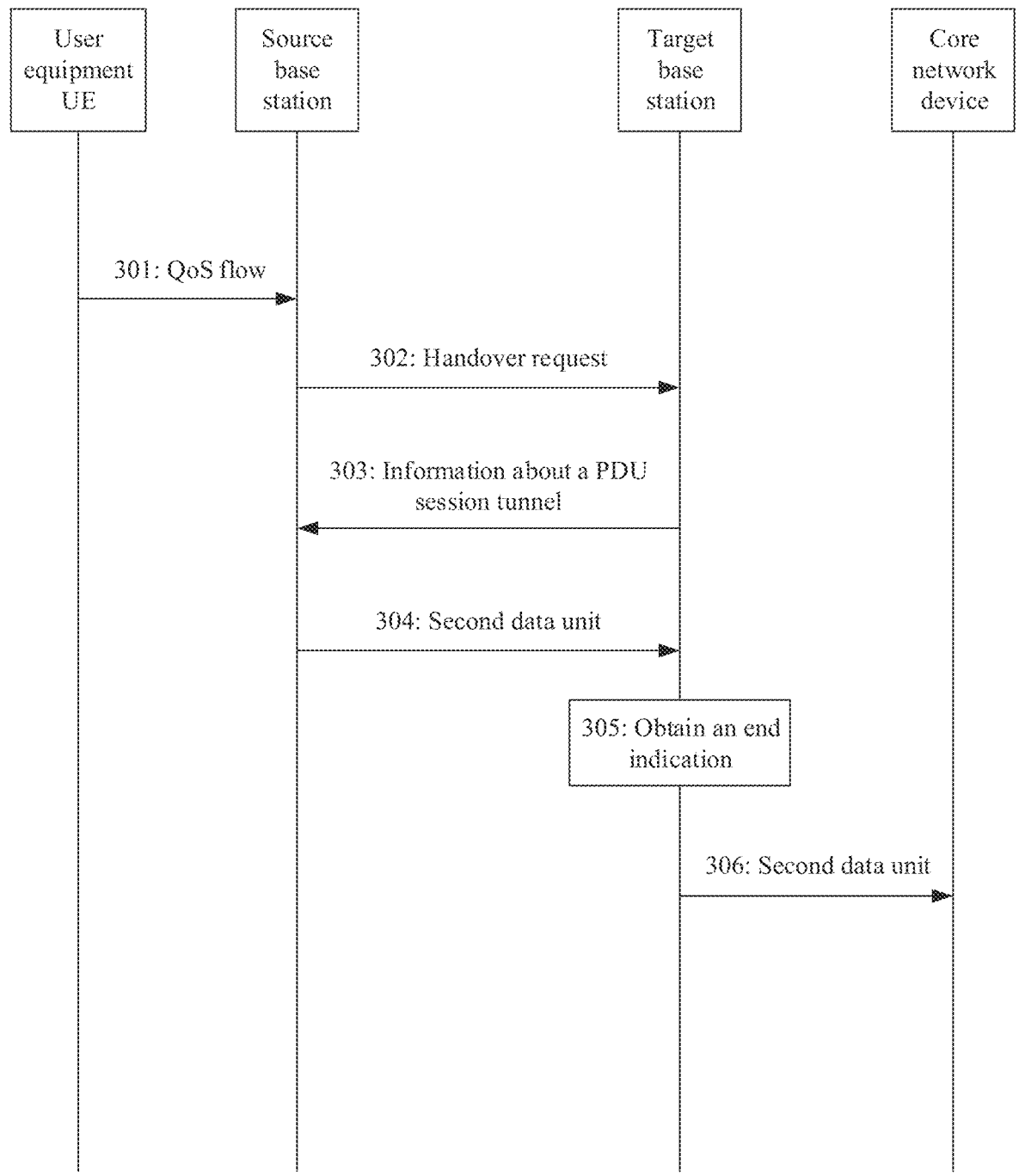
FIG. 3 is a schematic diagram of another embodiment of a handover method according to this application.

A: With reference to FIG. 3, for uplink data, a source base station sends a handover request including first indication information, so that a target base station establishes a PDU session tunnel for transferring a QoS flow that is buffered at an SDAP layer of the source base station due to a mapping relationship change. Therefore, a base station handover may also occur in a case of the mapping relationship change, and it is ensured that data units are reported in sequence.

301: UE sends a QoS flow to the source base station.

The UE maps the QoS flow to a first DRB, so as to send a first data unit to the source base station by using the first DRB. If the source base station notifies the UE to change an uplink mapping relationship of the QoS flow, in other words, a mapping relationship between the QoS flow and a DRB changes, the UE generates an end indication, and the UE sends the end indication on the first DRB. The end indication may be a protocol data unit end marker (end marker PDU), and is used to indicate that an SDAP entity of the UE has stopped mapping the QoS flow to the first DRB, or indicate that sending of the QoS flow of the UE on the first DRB ends. Optionally, when the source base station receives the end indication, the source base station learns that sending of data of the QoS flow on the first DRB ends.

Then, the UE maps the QoS flow to a second DRB, so as to send a second data unit to the source base station by using the second DRB. The source base station buffers the second data unit at the SDAP layer. In a process in which the UE sends the QoS flow to the source base station by using the DRB, because the mapping relationship between the QoS flow and the DRB changes, the source base station may first receive the second data unit and then receive the first data unit.

302: The source base station sends the handover request to the target base station.

This step in this embodiment is similar to step 201 in the foregoing embodiment, and details are not described herein again.

303: The target base station sends information about a PDU session tunnel to the source base station.

The target base station may learn, based on the handover request, that the mapping relationship between the QoS flow and the DRB changes. The target base station establishes the PDU session tunnel, allocates an address to the tunnel, and then sends the information about the PDU session tunnel to the source base station, and the PDU session tunnel is used by the source base station to transfer the second data unit. The information about the PDU session tunnel includes a transport layer address and a GTP-TEID of the PDU session tunnel. Optionally, the information about the tunnel further includes an identifier of a protocol data unit PDU session corresponding to the QoS flow, so that the source base station determines, based on the information about the tunnel, information about a tunnel of a specific PDU session. The PDU session tunnel is a tunnel for transmitting the uplink data.

It needs to be noted that for the uplink data, there is no PDU session tunnel between base stations, and the target base station sends the information about the PDU session tunnel to the source base station after newly establishing the PDU session tunnel.

304: The source base station sends the second data unit to the target base station through the PDU session tunnel.

The source base station sends the second data unit to the target base station through the PDU session tunnel. The second data unit is a data unit of the uplink data.

Optionally, the source base station sends a GPRS tunnelling protocol-user plane (GPRS tunnelling protocol user plane, GTP-U) header or an extension header that is of the second data unit and that includes an indication, to indicate that the second data unit is a data unit buffered at the SDAP layer.

Optionally, the source base station may further send the GTP-U header or the extension header that is of the second data unit and that includes a QoS flow identifier, to indicate that the data unit is a data unit of a specific QoS flow in the PDU session tunnel.

Optionally, when the source base station does not receive all data packets in the first data unit, due to impact of a wireless communication channel change, some data packets in the first data unit sent by the UE to the source base station are not correctly received by the source base station. However, data packets behind these data packets in the first data unit are correctly received by the source base station, and the source base station cannot submit these correctly received data packets to a core network device. For example, packet_1 is not correctly received, packet_2/3 is correctly received by the base station, and packet_2/3 cannot be submitted by the source base station to the core network device. The source base station also needs to transfer packet_2/3 to the target base station through a tunnel corresponding to a DRB on which these data packets are located, and the UE resends packet_1 to the target base station on a DRB 1. The target base station submits packet_1/2/3 to the core network device only after receiving packet_1. It needs to be noted that in a case of the wireless channel change, when data packets (for example, packet_2/3) received by the source base station are forwarded to the target base station, because the UE sends the end indication to the source base station by using the DRB 1, if the source base station correctly receives the end indication, the source base station also forwards the end indication to the target base station through a DRB tunnel corresponding to the DRB 1. Forms of the data packets and the end indication that are forwarded by the source base station to the target base station are PDCP SDUs. After receiving these PDCP SDUs (which are usually buffered at the PDCP layer), the target base station needs to submit these PDCP SDUs to an SDAP layer of the target base station after a data packet (for example, packet_1) before these data packets is also correctly received.

Optionally, when the source base station receives all the data packets in the first data unit, the source base station submits the first data unit to the core network device, and in addition, the source base station transfers the end indication to the target base station.

Optionally, before or after step 304, the source base station sends a handover command to the UE, to instruct the UE to perform an inter-base station handover. After receiving the corresponding handover command, the UE accesses a cell of the target base station.

305: The target base station obtains the end indication.

That the target base station obtains the end indication means that the SDAP layer of the target base station receives the end indication.

Regardless of the impact of the wireless communication channel change, after the source base station correctly receives the end indication sent by the UE, the source base station transfers the end indication to the target base station. It needs to be noted that the source base station transfers the end indication to the target base station in a form of a PDCP SDU.

Due to the impact of the wireless communication channel change, if the source base station does not correctly receive the end indication sent by the UE, in this case, the UE further resends the end indication to the target base station by using the DRB 1. It needs to be noted that the UE retransmits the PDCP SDU corresponding to the end indication.

306: The target base station sends the second data unit to the core network device based on the end indication.

When the SDAP layer of the target base station receives the end indication, the target base station learns, based on the indication, that all data units transmitted by using the first DRB have been received. It may be further learned that the source base station or the target base station has submitted the first data unit to the core network device. Then, the target base station sends the second data unit to the core network device. This ensures that the second data unit is sent to the core network device after the first data unit, to ensure that the data units are reported in sequence.

In this embodiment, the source base station sends the handover request including the first indication information, and the target base station may determine, based on the first indication information, that the DRB corresponding to the QoS flow changes from the first DRB to the second DRB, so that the target base station sends the information about the PDU session tunnel to the source base station and transfers the second data unit through the tunnel. After receiving the end indication, the target base station submits the second data unit to the core network device. This ensures that the data units in the QoS flow are submitted in sequence, thereby ensuring normal communication of a communications system.

Figure 4:
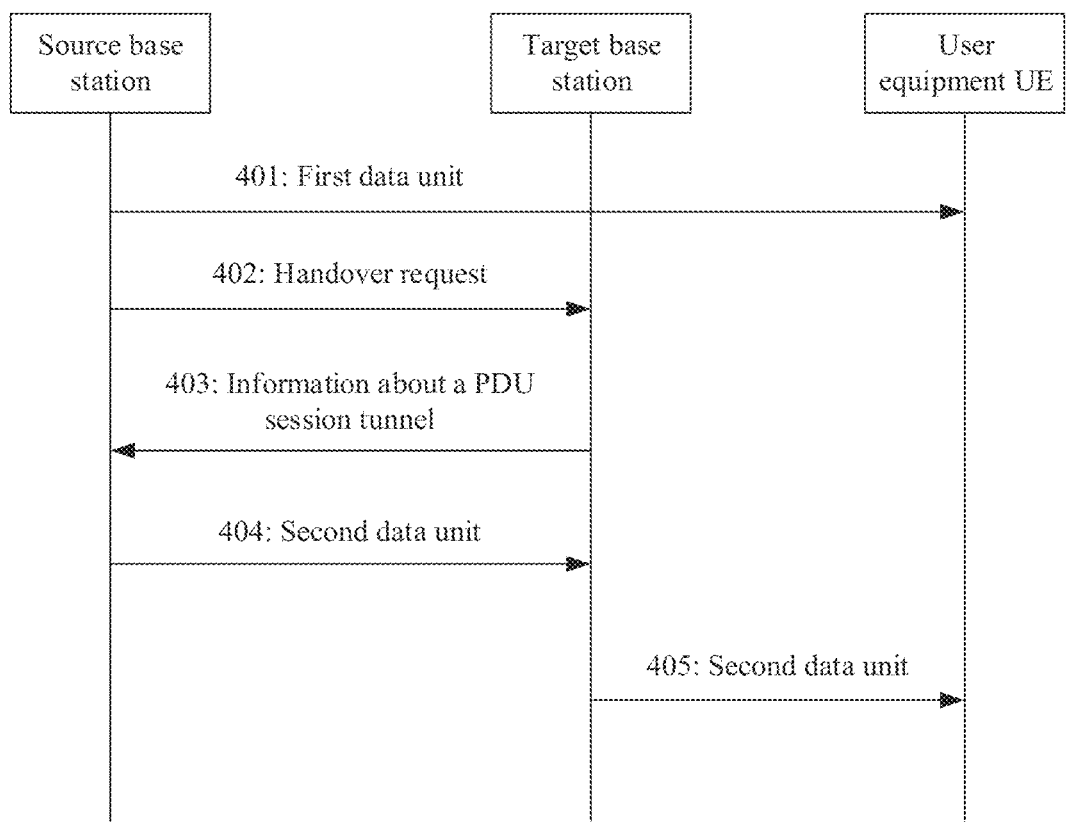
FIG. 4 is a schematic diagram of another embodiment of a handover method according to this application.

B: With reference to FIG. 4, for downlink data, a source base station sends a handover request including first indication information, so that a target base station establishes a PDU session tunnel for transferring a QoS flow that is buffered at an SDAP layer of the source base station due to a mapping relationship change. Therefore, a base station handover may also occur in a case of the mapping relationship change, and it is ensured that data units are reported in sequence.

401: The source base station sends a first data unit to UE.

The source base station maps the QoS flow to a first DRB, so as to send the first data unit to the UE.

Then, the source base station changes a downlink mapping relationship of the QoS flow, in other words, a mapping relationship between the QoS flow and a DRB changes, and the DRB to which the QoS flow is mapped changes from a first DRB to a second DRB. The source base station buffers, at the SDAP layer of the source base station, a second data unit that is of the QoS flow and that needs to be sent by using the second DRB.

402: The source base station sends the handover request to the target base station.

This step in this embodiment is similar to step 201 in the foregoing embodiment, and details are not described herein again.

403: The target base station sends information about a PDU session tunnel to the source base station.

The target base station may learn, based on the handover request, that the mapping relationship between the QoS flow and the DRB changes. The target base station establishes the PDU session tunnel, allocates an address to the tunnel, and then sends the information about the PDU session tunnel to the source base station, and the PDU session tunnel is used by the source base station to transfer the second data unit. The information about the PDU session tunnel includes a transport layer address and a GTP-TEID of the PDU session tunnel. Optionally, the information about the tunnel further includes an identifier of a protocol data unit PDU session corresponding to the QoS flow, so that the source base station determines, based on the information about the tunnel, information about a tunnel of a specific PDU session. The PDU session tunnel is a tunnel for transmitting the downlink data.

It needs to be noted that for the downlink data, there is also a PDU session tunnel between base stations, and the target base station may send the information about the PDU session tunnel to the source base station after newly establishing the PDU session tunnel. Alternatively, an existing PDU session tunnel may be used to send the information about the PDU session tunnel to the source base station. When the source base station transfers the second data unit through the existing PDU session tunnel, indication information needs to be added to indicate that the second data unit is a data unit buffered at the SDAP layer.

404: The source base station sends the second data unit to the target base station through the PDU session tunnel.

The source base station sends the second data unit to the target base station through the PDU session tunnel. The second data unit is a data unit of the downlink data.

Optionally, the source base station sends a GPRS tunnelling protocol for the user plane header or an extension header that is of the second data unit and that includes an indication, to indicate that the second data unit is the data unit buffered at the SDAP layer.

Optionally, the source base station may further send the GTP-U header or the extension header that is of the second data unit and that includes a QoS flow identifier, to indicate that the data unit is a data unit of a specific QoS flow in the PDU session tunnel.

Optionally, due to impact of a wireless communication channel change, some data packets in the first data unit sent by the source base station to the UE are not correctly received by the UE, and the source base station needs to transfer these data packets to the target base station through a DRB tunnel. For example, packet_2/3 is not correctly received by the UE. In this case, the source base station also needs to transfer packet_2/3 to the target base station through the DRB tunnel. The target base station resends packet_2/3 to the UE on a DRB 1.

405: After the target base station determines that the QoS flow mapped to the first DRB is received by the UE, the target base station sends the second data unit to the UE.

The target base station determines, based on the first indication information, that a DRB corresponding to the QoS flow before the mapping relationship changes is the first DRB, and determines whether the QoS flow (namely, the first data unit) mapped to the first DRB is received by the UE. A determining manner may be: The target base station determines whether there is still the QoS flow on the first DRB. If there is not the QoS flow, it indicates that the first data unit has been received by the UE. Alternatively, the target base station sets a timer. After the timer expires, it is considered that the first data unit has been received by the UE. The target base station may determine, in another manner, whether the QoS flow mapped to the first DRB is received by the UE. This is not specifically limited herein.

If the QoS flow mapped to the first DRB has been received by the UE, the target base station maps the QoS flow to the second DRB, so as to send the second data unit to the UE. This ensures that the second data unit is sent to the UE after the first data unit, to ensure that the data units are reported in sequence.

In this embodiment, for the downlink data, the source base station sends the handover request including the first indication information, and the target base station may determine, based on the first indication information, that the DRB corresponding to the QoS flow to which the data unit belongs changes from the first DRB to the second DRB. Therefore, the target base station sends the information about the PDU session tunnel to the source base station, and the second data unit is transferred between the source base station and the target base station through the PDU session tunnel, so that after the target base station determines that the mapping relationship between the QoS flow and the first DRB ends, the first data unit has been reported to the UE, and the target base station then sends the second data unit to the UE. This ensures that the data units in the QoS flow are reported in sequence, thereby ensuring normal communication of a communications system.

2. A tunnel is a DRB tunnel.

Figure 5:
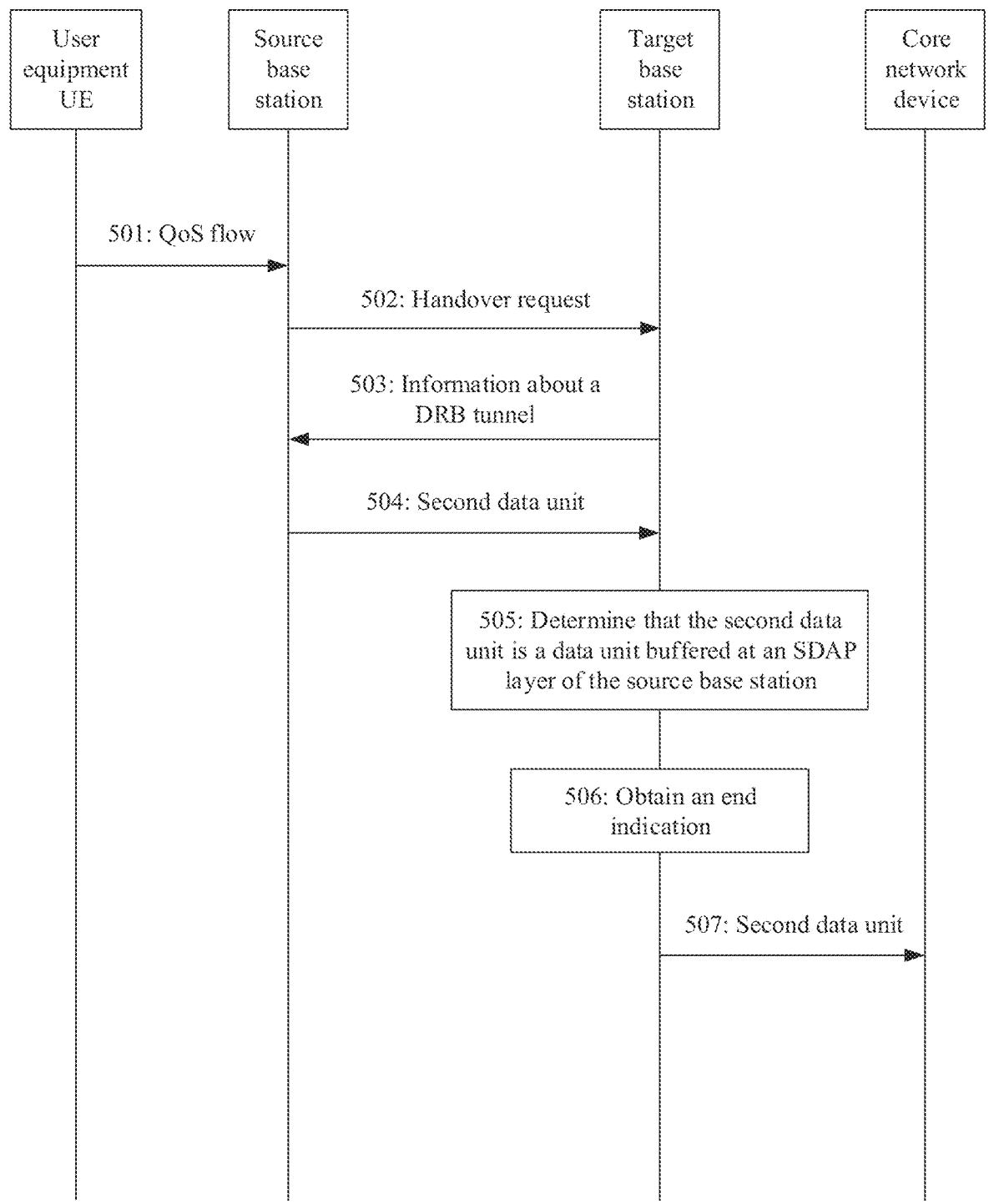
FIG. 5 is a schematic diagram of another embodiment of a handover method according to this application.

A: With reference to FIG. 5, for uplink data, a source base station sends a handover request including first indication information, so that a target base station establishes a DRB tunnel for transferring a QoS flow that is buffered at an SDAP layer of the source base station due to a mapping relationship change and sends information about the DRB tunnel to the source base station. Then, the source base station sends sequence number status transfer information to the target base station by using a control plane and sends a second data unit to the target base station through the DRB tunnel. The target base station may learn specific data packets of the second data unit based on the sequence number status transfer information or indication information carried in the second data unit transferred by the source base station. Therefore, a base station handover may also occur in a case of the mapping relationship change, and it is ensured that the data units are reported in sequence.

501: UE sends the QoS flow to the source base station.

502: The source base station sends the handover request to the target base station.

Steps 501 and 502 in this embodiment are similar to steps 301 and 302 in the foregoing embodiment, and details are not described herein again.

503: The target base station sends the information about the DRB tunnel to the source base station.

The target base station may learn, based on the handover request, that a mapping relationship between the QoS flow and a DRB changes. The target base station establishes the DRB tunnel, allocates an address to the tunnel, and then sends the information about the DRB tunnel to the source base station, where the DRB tunnel may be an original DRB tunnel, and the DRB tunnel is used by the source base station to transfer the second data unit. The information about the DRB tunnel includes a transport layer address and a GTP-TEID of the DRB tunnel. Optionally, the information about the tunnel includes an identifier of a DRB corresponding to the QoS flow, so that the source base station determines, based on the information about the tunnel, information about a tunnel of a specific DRB. The DRB tunnel is a DRB tunnel for transmitting the uplink data.

504: Send the second data unit to the target base station through the DRB tunnel.

After obtaining address information of the DRB tunnel, the source base station sends, to the target base station in a form of a packet data convergence protocol service data unit (packet data convergence protocol service data unit, PDCP SDU), the second data unit buffered at the SDAP layer of the source base station. The second data unit is a data unit of the uplink data.

In this embodiment, data of the source base station is transferred to the target base station through the DRB tunnel, to ensure a lossless handover of the transferred data.

Optionally, the source base station also sends sequence number status transfer information of the second data unit to the target base station, and the sequence number status transfer information is specifically packet data convergence protocol sequence number (packet data convergence protocol serial number, PDCP SN) information. The target base station may learn of, based on the sequence number status transfer information, specific data packets that are transmitted in the tunnel and that belong to the second data unit. Optionally, the source base station may recover the second data unit buffered at the SDAP of the source base station to the PDCP SDU, and simultaneously recover a PDCP SN number of the second data unit at a PDCP layer.

It needs to be noted that in this embodiment, there is a DRB tunnel corresponding to a first DRB and a DRB tunnel corresponding to a second DRB between the source base station and the target base station. The DRB tunnel in this application may be the same tunnel as the DRB tunnel corresponding to the second DRB.

In addition, in this application, the sequence number status transfer information of the second data unit is further used to indicate that the second data unit sent by the source base station to the target base station is a data unit buffered at the SDAP layer of the source base station. For example, a bit string of the PDCP SN number is used to indicate whether a data unit before an SN number corresponding to the first lost uplink PDCP SDU on a DRB corresponding to the DRB tunnel is a data unit buffered at the SDAP layer. For example, a PDCP SN number corresponding to the first lost data unit is X, and a bit string is used to indicate whether a data unit, on the DRB, before the PDCP SN number X is a data unit buffered at the SDAP layer of the source base station, 0 may be used to indicate that the data unit is a data unit buffered at the SDAP layer, and 1 may be used to indicate that the data unit is not a data unit buffered at the SDAP layer, so that another type of data unit transferred between the source base station and the target base station, namely, a data unit that is not buffered at the SDAP layer, is distinguished from the data unit. Alternatively, on the contrary, 1 may be used to indicate that the data unit is a data unit buffered at the SDAP layer, and 0 may be used to indicate that the data unit is not a data unit buffered at the SDAP layer.

Optionally, before or after 504, the source base station sends a handover command to the UE, to instruct the UE to perform an inter-base station handover. After receiving the corresponding handover command, the UE accesses a cell of the target base station.

Optionally, when the source base station transfers the second data unit through the DRB tunnel, some indication information may be carried to indicate that the data unit is the second data unit buffered at the SDAP layer, so that the another type of data unit transferred between the source base station and the target base station, namely, the data unit that is not buffered at the SDAP layer, is distinguished from the data unit. Optionally, the source base station sends a GTP-U header or an extension header that is of the second data unit and that includes the sequence number status indication information.

Optionally, the source base station may further send the GTP-U header or the extension header that is of the second data unit and that includes a QoS flow identifier, to indicate that the packet is a data unit of a specific QoS flow in the PDU session tunnel.

505: The target base station determines that the second data unit is the data unit buffered at the SDAP layer of the source base station.

Optionally, the target base station may determine, based on the sequence number status transfer information of the second data unit, that the second data unit is the data unit buffered at the SDAP layer of the source base station.

Optionally, the target base station may alternatively determine, based on the indication information carried in the transferred data of the DRB tunnel, that the second data unit is the data unit buffered at the SDAP layer of the source base station.

506: The target base station obtains end indication information.

In a case in which the source base station does not receive all data packets in the first data unit and in a case in which the source base station receives all data packets in the first data unit, a possible case in which the first data unit is submitted to a core network device and a possible case in which the target base station obtains an end indication are similar to corresponding descriptions in step 304 in the foregoing embodiment, and details are not described herein again.

Step 506 in this embodiment is similar to step 305 in the foregoing embodiment, and details are not described herein again.

507: The target base station sends the second data unit to the core network device based on the end indication.

Step 507 in this embodiment is similar to step 306 in the foregoing embodiment, and details are not described herein again.

In this embodiment, the source base station sends the second data unit to the target base station through the DRB tunnel, and simultaneously sends the sequence number status indication information of the second data unit to the target base station, or the indication information is carried when the second data unit is sent, so that the target base station determines, based on the indication information, that the second data unit is the data unit that is buffered at the SDAP layer due to the mapping relationship change. Therefore, after receiving the end indication sent by the UE, the target base station may also report the second data unit to the core network device even if the first data unit is not received, to ensure that the first data unit and the second data unit are reported in sequence.

Figure 6:
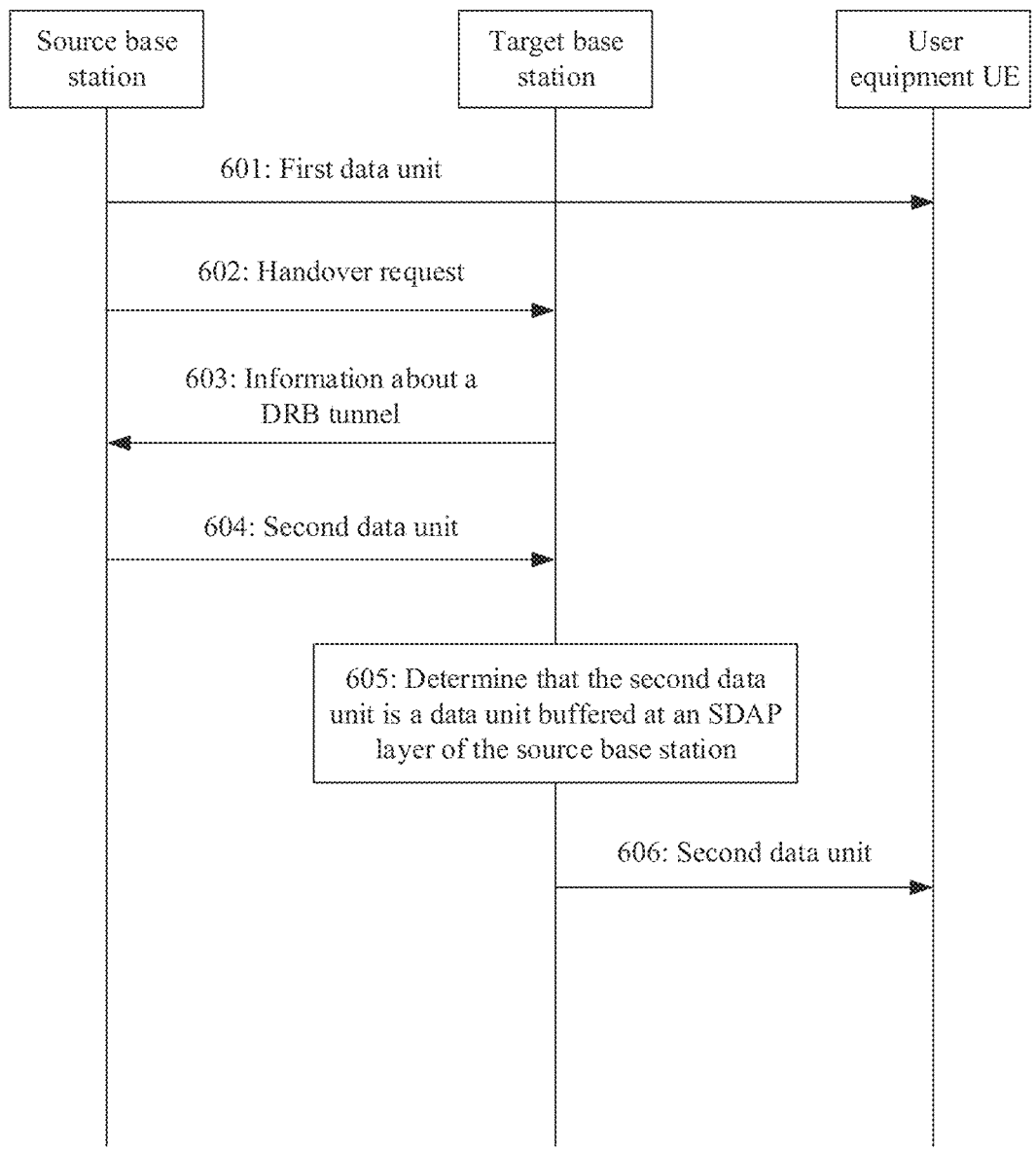
FIG. 6 is a schematic diagram of another embodiment of a handover method according to this application.

B: With reference to FIG. 6, for downlink data, a source base station sends a handover request including first indication information, so that a target base station establishes a DRB tunnel for transferring a QoS flow that is buffered at an SDAP layer of the source base station due to a mapping relationship change and sends information about the DRB tunnel to the source base station. Then, the source base station sends sequence number status transfer information to the target base station by using a control plane and sends a second data unit to the target base station through the DRB tunnel. The target base station may separately submit the second data unit to UE based on the sequence number status transfer information or indication information carried in the second data unit transferred by the source base station. Therefore, a base station handover may also occur in a case of the mapping relationship change, and it is ensured that data units are reported in sequence.

601: The source base station sends a first data unit to the UE.

602: The source base station sends the handover request to the target base station.

Steps 601 and 602 in this embodiment are similar to steps 401 and 402 in the foregoing embodiment, and details are not described herein again.

603: The target base station sends the information about the DRB tunnel to the source base station.

This step in this embodiment is similar to step 503 in the foregoing embodiment. A difference lies in that the DRB tunnel is a DRB tunnel for transmitting the downlink data. Details are not described herein again.

604: The source base station sends the second data unit to the target base station through the DRB tunnel.

This step in this embodiment is similar to step 504 in the foregoing embodiment. A difference lies in that the second data unit is a data unit of the downlink data. Details are not described herein again.

In this embodiment, data of the source base station is transferred to the target base station through the DRB tunnel, to ensure a lossless handover of the transferred data.

605: The target base station determines that the second data unit is a data unit buffered at the SDAP layer of the source base station.

This step in this embodiment is similar to step 505 in the foregoing embodiment, and details are not described herein again.

606: After the target base station determines that a QoS flow mapped to a first DRB is received by the UE, the target base station sends the second data unit to the UE.

Step 606 in this embodiment is similar to step 405 in the foregoing embodiment, and details are not described herein again.

In this embodiment, the source base station sends the second data unit to the target base station through the DRB tunnel, and also sends the sequence number status indication information of the second data unit to the target base station, or the indication information is carried when the second data unit is sent, so that the target base station determines, based on the sequence number status indication information, that the second data unit is the data unit that is buffered at the SDAP layer due to the mapping relationship change. Therefore, after receiving an end indication sent by the UE, the target base station may also report the second data unit to the UE even if the first data unit is not received, to ensure that the first data unit and the second data unit are reported in sequence.

Figure 7:
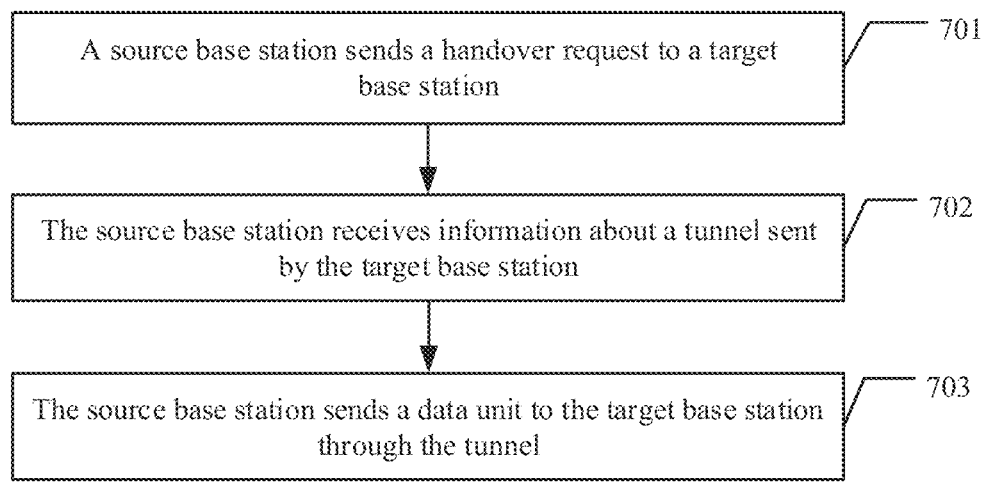
FIG. 7 is a schematic diagram of another embodiment of a handover method according to this application.

The foregoing describes the embodiments of this application from a perspective of a target base station. With reference to FIG. 7, the following describes this application from a perspective of a source base station.

701: A source base station sends a handover request to a target base station.

In this embodiment, the handover request includes first indication information, and the first indication information is used to indicate that a data radio bearer DRB corresponding to a quality of service flow QoS flow of the source base station changes from a first DRB to a second DRB.

A specific form of the first indication information and a specific meaning indicated when the DRB corresponding to the QoS flow changes from the first DRB to the second DRB are similar to those in step 201 in the foregoing embodiment. Details are not described herein again.

702: The source base station receives information about a tunnel sent by the target base station.

In this embodiment, after establishing the tunnel, the target base station allocates an address to the tunnel and sends the information about the tunnel to the target base station, and the information about the tunnel includes a transport layer address and a GPRS tunnelling protocol tunnel endpoint identifier GTP-TEID. Optionally, the information about the tunnel sent by the target base station may be distinguished for an uplink and a downlink, namely, information about an uplink tunnel and/or information about a downlink tunnel.

The tunnel may be a PDU session tunnel, or may be a DRB tunnel. If the tunnel is the PDU session tunnel, the information about the tunnel includes an identifier of a protocol data unit PDU session corresponding to the QoS flow, so that the source base station determines that the information about the tunnel is information about a tunnel of a specific PDU session. If the tunnel is the DRB tunnel, the information about the tunnel includes an identifier of a DRB corresponding to the QoS flow, so that the source base station determines, based on the information about the tunnel, information about a tunnel of a specific DRB. If the tunnel is the DRB tunnel, the source base station further needs to receive sequence number status transfer information from the target base station, and the sequence number status transfer information includes a PDCP SN number of a data unit. A function of the PDCP SN number is similar to that in the foregoing embodiment, and details are not described herein again.

703: The source base station sends a data unit to the target base station through the tunnel.

The data unit is a data unit obtained after the DRB corresponding to the QoS flow changes to the second DRB, and there is a data unit, in the QoS flow, obtained before the DRB corresponding to the QoS flow changes.

The source base station sends the data unit to the target base station through the tunnel. Therefore, for uplink data, after receiving an end indication sent by UE, the target base station may determine that a mapping relationship between the QoS flow and the first DRB ends, so that the target base station sends the data unit to a core network device, to ensure that data units in the QoS flow are reported in sequence. For downlink data, the target base station determines whether a mapping relationship between the QoS flow and the first DRB ends. If the mapping relationship between the QoS flow and the first DRB ends, the target base station sends the data unit to UE, to ensure that data units in the QoS flow are reported in sequence.

In this embodiment, the source base station sends, to the target base station, the handover request that includes the first indication information, so that the target base station feeds back the information about the tunnel. The tunnel is used by the source base station to transfer the data unit obtained after the data radio bearer DRB corresponding to the QoS flow changes from the first DRB to the second DRB, to ensure that the data units in the QoS flow are reported in sequence.

Figure 8A:
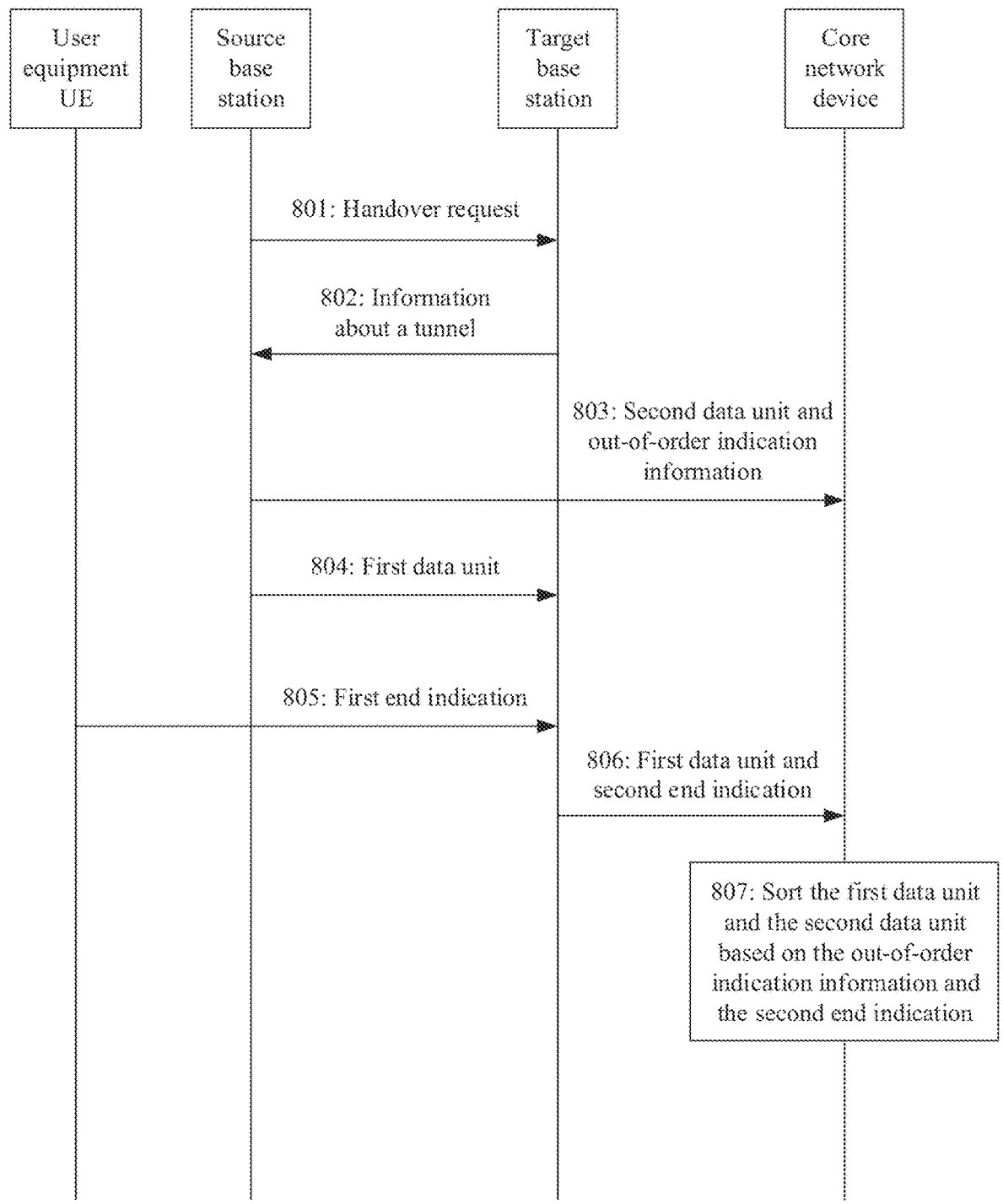
FIG. 8(a) is a schematic diagram of another embodiment of a handover method according to this application.

With reference to FIG. 8(a), this application further provides a handover method. A source base station reports, to a core network device, a second data unit obtained after a DRB corresponding to a QoS flow changes to a second DRB. A target base station reports, to the core network device, a first data unit whose DRB corresponding to the QoS flow is a first DRB. Then, the core network device sorts the first data unit and the second data unit.

801: The source base station sends a handover request to the target base station.

The source base station sends the handover request to the target base station, to request to perform a handover.

802: The target base station sends information about a tunnel to the source base station.

After receiving the handover request, the target base station establishes the tunnel, and then sends the information about the tunnel to the source base station. The tunnel may be a DRB tunnel, or may be a PDU session tunnel. This is not specifically limited herein.

803: The source base station sends the second data unit and out-of-order indication information to the core network device.

Because a mapping relationship between the DRB and an uplink QoS flow received by the source base station changes from the first DRB to the second DRB, the source base station first receives the second data unit that is sent by UE by using the second DRB after the DRB corresponding to the QoS flow changes to the second DRB. Then, the source base station receives the first data unit that is sent by the UE by using the first DRB before the mapping relationship of the DRB corresponding to the QoS flow changes. The first data unit and the second data unit belong to the same QoS flow, and the QoS flow is buffered at an SDAP layer of the source base station due to a mapping relationship change. In a time sequence, the first data unit is a data unit before the second data unit.

When a base station handover occurs, the source base station sends the second data unit and the out-of-order indication information to the core network device, and the out-of-order indication information is used to indicate that the second data unit reported by the source base station is a data unit sent in an abnormal sequence. A data unit is still not reported before the second data unit, and the out-of-order indication information may be carried in a GTP-U header or an extension header of the second data unit.

804: The source base station sends the first data unit to the target base station through the tunnel.

805: The target base station obtains a first end indication.

The UE maps the QoS flow to the first DRB, so as to send the first data unit to the source base station by using the first DRB. Then, the source base station indicates the UE to change an uplink mapping relationship of the QoS flow, in other words, the mapping relationship between the QoS flow and the DRB changes. After the UE receives the notification indicating to change the mapping relationship, the UE generates the first end indication, and the UE sends the first end indication on the first DRB.

Optionally, if the source base station correctly receives the first end indication sent by the UE, the source base station transfers the first end indication to the target base station. It needs to be noted that the source base station transfers the first end indication to the target base station in a form of a PDCP SDU.

Due to impact of a wireless communication channel change, if the source base station does not correctly receive the first end indication sent by the UE, in this case, the UE further resends the first end indication to the target base station by using the first DRB. It needs to be noted that the UE retransmits the PDCP SDU corresponding to the first end indication.

806: The target base station sends the first data unit and a second end indication to the core network device.

When an SDAP layer of the target base station receives data corresponding to the first data unit, the target base station sends the data to a core network. When receiving the first end indication sent by the UE, the SDAP layer of the target base station may learn, based on the first end indication, that a mapping relationship between the QoS flow and the first DRB ends, and the target base station sends the second end indication to the core network. The core network device may learn, based on the second end indication, that all data units in the QoS flow before the mapping relationship changes have been received by the core network device.

807: The core network device sorts the first data unit and the second data unit based on the out-of-order indication information and the second end indication.

The core network device determines, based on the second end indication, that the data unit before the second data unit has been received, and also determines, based on the out-of-order indication information, that the first data unit is the data unit before the second data unit, to sort the first data unit and the second data unit and ensure a sequence between the first data unit and the second data unit, thereby ensuring normal communication of a communications system.

Figure 8B:
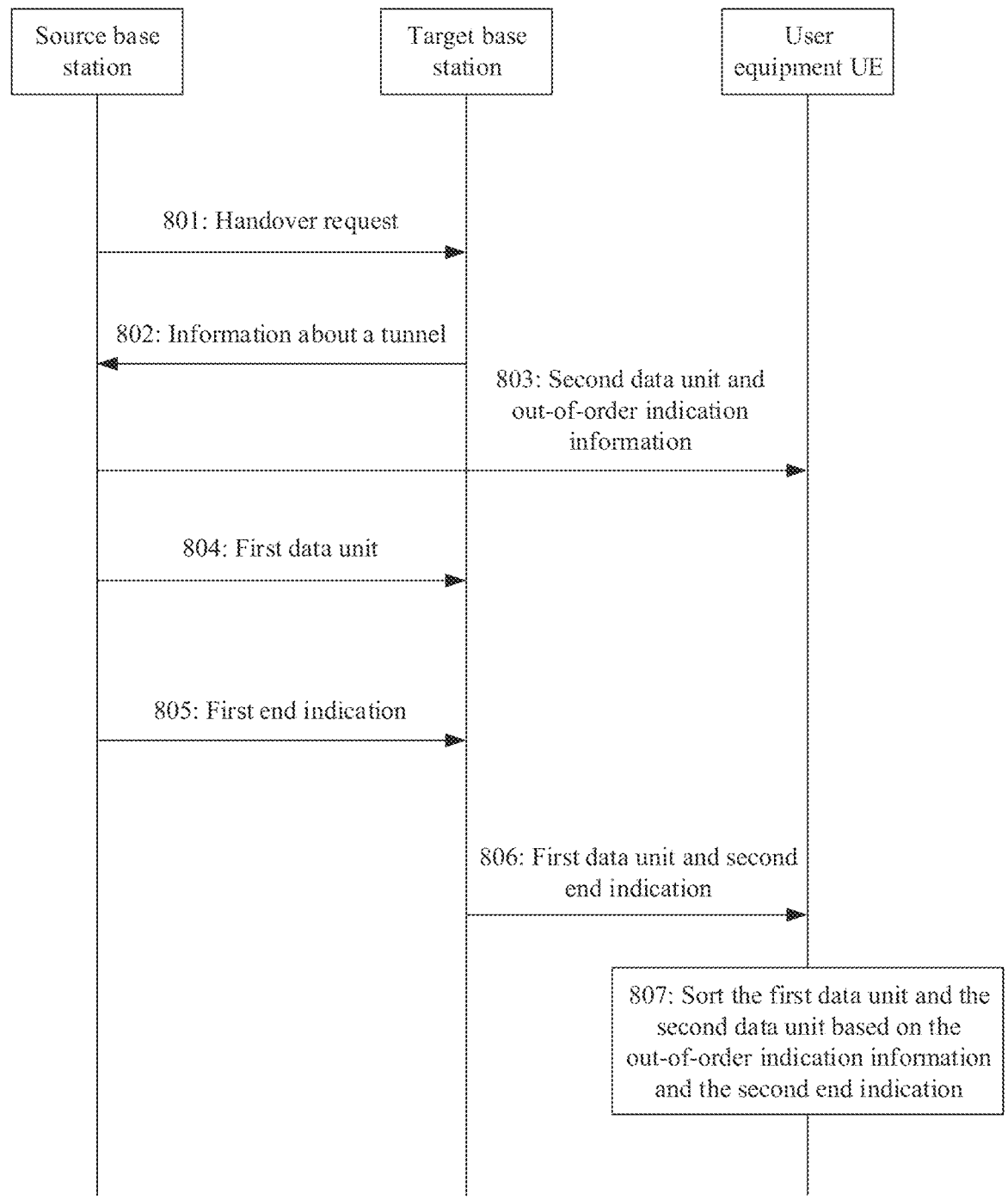
FIG. 8(b) is a schematic diagram of another embodiment of a handover method according to this application.

When the QoS flow is a downlink data flow, a handover manner is similar to the manner in FIG. 8(a). With reference to FIG. 8(b), a difference lies in that the target base station cannot receive the first end indication sent by the UE. Instead, the target base station determines whether the QoS flow mapped to the first DRB, namely, the first data unit, is received by the UE. A determining manner may be: The target base station determines whether there is still the QoS flow on the first DRB. If there is not the QoS flow, it indicates that the first data unit has been received by the UE. Alternatively, the target base station sets a timer. After the timer expires, it is considered that the first data unit has been received by the UE. The target base station may determine, in another manner, whether the QoS flow mapped to the first DRB is received by the UE. This is not specifically limited herein. In addition, the first data unit and the second data unit are separately reported to the UE instead of the core network device.

It needs to be noted that the foregoing embodiments in FIG. 2 to FIG. 8(b) are also applicable to a scenario in which indirect exchange is performed by using a core network in a handover process, and the scenario may be referred to as a handover that is based on an interface between the core network and a base station. For example, a message exchanged between the source base station and the target base station needs to first pass through the core network device, and then reach a peer end.

Figure 9:
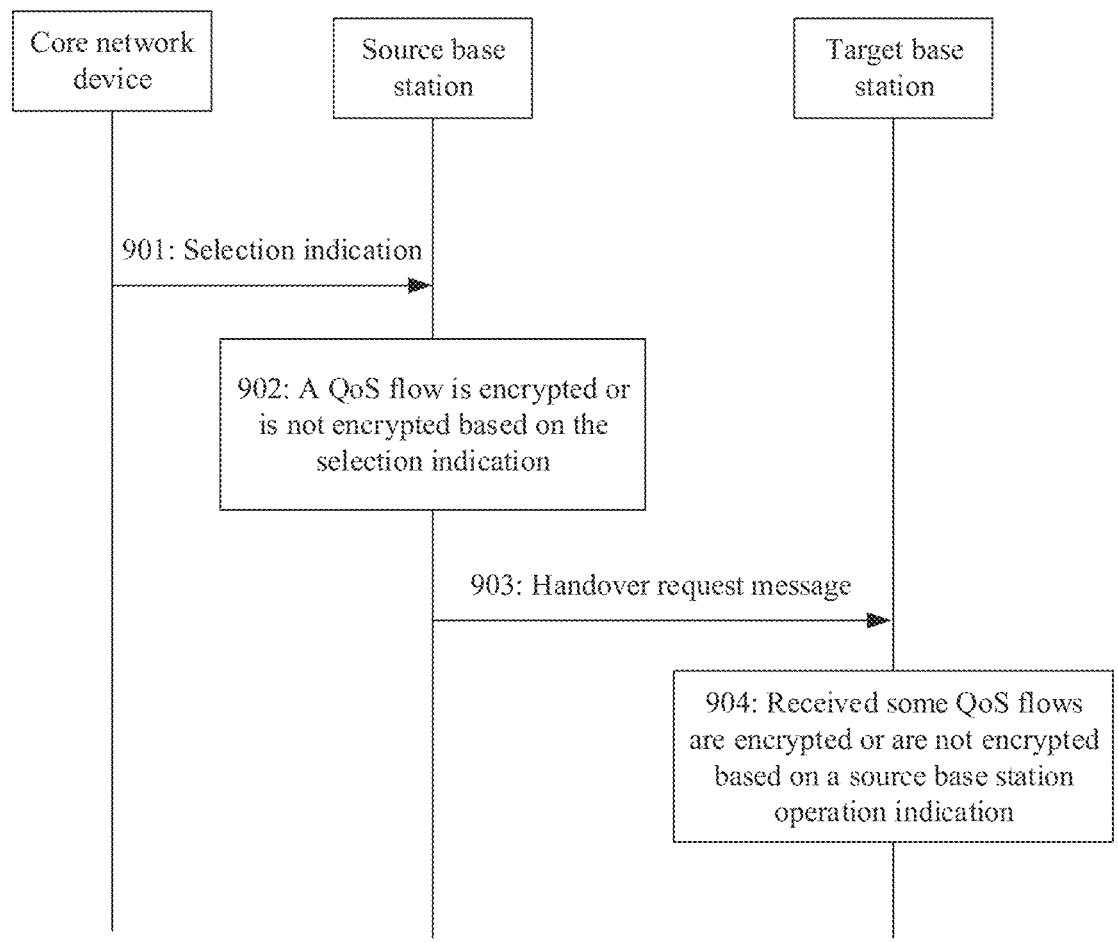
FIG. 9 is a schematic diagram of an embodiment of encrypting a QoS flow according to this application.

With reference to FIG. 9, in a dual connectivity (dual connectivity, DC) scenario, a source base station may transfer some QoS flows to a target base station for transmission. When a core network device requests to establish a PDU session, a base station sends an encryption indication (security indication) to the core network device. The encryption indication is one of an encryption preferred (preferred) indication, an encryption required (required) indication, and an encryption not needed (not needed) indication. The base station determines, based on the encryption indication, to perform a corresponding operation on a QoS flow in the PDU session. Similarly, the base station may also send an integrity protection indication (integrity protection indication) to the core network device. The integrity protection indication is one of an integrity protection preferred indication (preferred) indication, an integrity protection required indication (required) indication, and an integrity protection that is not needed indication (not needed) indication. The base station determines, based on the integrity protection indication, to perform a corresponding operation on the QoS flow in the PDU session. A preferred indication indicates that the base station determines whether to perform encryption or integrity protection, a required indication indicates that the base station needs to perform encryption or integrity protection, and a not needed indication indicates that the base station does not perform encryption or integrity protection. When some data flows in the PDU session are handed over from the source base station to the target base station, and an indication sent by the core network device to the source base station is an integrity protection preferred indication or an encryption preferred indication, if the source base station sends the indication to the target base station, there may be a case in which the source base station performs encryption or integrity protection, but the target base station does not perform encryption or integrity protection. Based on this, with reference to FIG. 9, the following describes an encryption manner of a QoS flow in a base station handover process in this application.

901: A core network device sends a selection indication to a source base station.

The core network device sends the selection indication to the source base station, and the selection indication is the foregoing encryption preferred indication.

902: The source base station encrypts or does not encrypt a QoS flow based on the selection indication.

The source base station chooses, based on the selection indication, whether to encrypt a PDU session.

903: The source base station sends a handover request message to the target base station.

The handover request message requests to hand over some QoS flows in the PDU session to the target base station, and the request message further carries a source base station operation indication. In a DC scenario, when a handover is performed from the source base station to the target base station, the source base station transfers some QoS flows in the PDU session to the target base station, and simultaneously sends the source base station operation indication to the target base station, so that the target base station determines, based on the source base station operation indication, whether the source base station performs encryption.

In this embodiment, the source base station operation indication may include a selection indication and an information element. Alternatively, the source base station operation indication may be an encryption required indication or an encryption that is not needed indication obtained by the source base station by modifying, based on an operation of the source base station, an encryption indication sent by the core network device. For example, the source base station changes, based on whether the source base station currently encrypts the PDU session, an encryption indication sent by the core network to the source base station to an encryption required (required) indication or an encryption that is not needed (not needed) indication.

904: The target base station encrypts or does not encrypt the received QoS flow based on the source base station operation indication.

A manner in which the target base station encrypts or does not encrypt the received some QoS flows based on the source base station operation indication is as follows:

In one manner, the source base station forwards the selection indication sent by the core network device to the source base station, and the information element is simultaneously carried. The information element is used to indicate that the source base station encrypts or does not encrypt the QoS flow, so that the target base station also encrypts the received part of the QoS flow. In another manner, the source base station changes the selection indication to an encryption required indication or an encryption that is not needed indication. If the source base station encrypts the QoS flow, the source base station sends the encryption required indication to the target base station, so that the target base station also encrypts the received part of the QoS flow. If the source base station does not encrypt the QoS flow, the source base station sends the encryption that is not needed indication to the target base station, so that the target base station does not encrypt the received part of the QoS flow.

In this embodiment, if encrypting the QoS flow, the source base station sends the source base station operation indication to the target base station, so that the target base station can perform a corresponding encryption operation based on the operation indication, to ensure consistency of encryption operations performed by the source base station and the target base station.

Figure 10:
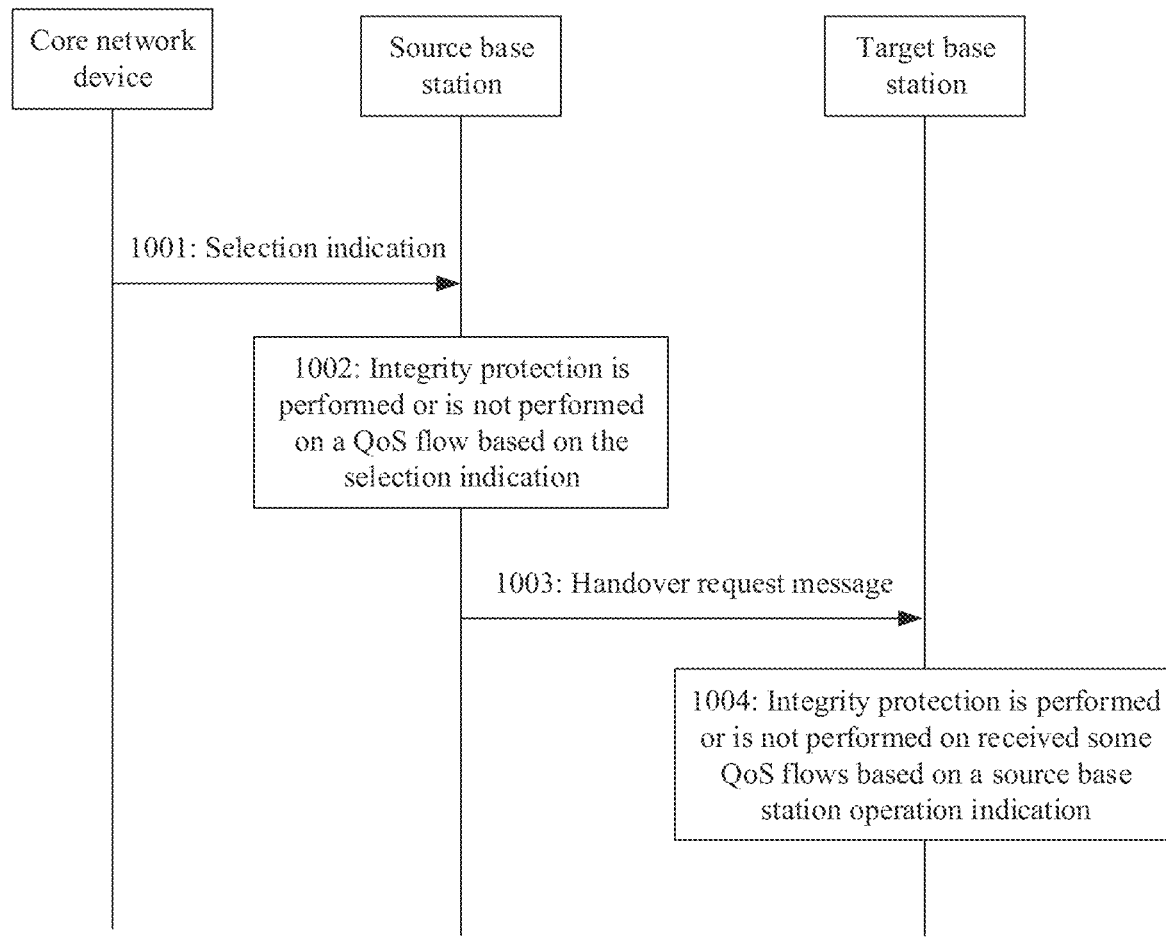
FIG. 10 is a schematic diagram of an embodiment of performing integrity protection on a QoS flow according to this application.

In this embodiment, with reference to FIG. 10, a case of integrity protection is similar to a case of encryption. Similarly, a source base station operation indication is sent to a target base station, so that the target base station can perform a corresponding integrity protection operation based on the operation indication. Details are not described herein again.

A base station may serve UE in a dual connectivity (DC) manner. In DC, the UE simultaneously communicates with two base stations, and the two base stations are respectively referred to as a master node (master node, MN) and a secondary node (secondary node, SN). In a scenario in which both the MN and the SN are connected to a 4G core network EPC, the MN configures at least two DC manners for the UE. Similarly, in a scenario in which both the MN and the SN are connected to a 5G core network 5GC or a subsequently evolved mobile network, there are also at least two DC manners. For example, LTE DC and E-UTRA NR DC are two DC manners in a 4G core network EPC scenario.

1. When both the MN and the SN are LTE base stations eNBs, a DC manner in this case is referred to as the LTE DC.

2. The MN is an LTE base station eNB, and the SN is an NR base station gNB. A DC manner in this case is referred to as the E-UTRA NR DC, EN-DC for short.

NG EN-DC, NE-DC, and NR-NR DC are three DC manners in the scenario in which both the MN and the SN are connected to the 5G core network 5GC.

1. The MN is an LTE base station ng-eNB, and the SN is an NR base station gNB. A DC manner in this case is referred to as the NG EN-DC.

2. The MN is an NR base station gNB, and the SN is an LTE base station ng-eNB. A DC manner in this case is referred to as the NE-DC.

3. Both the MN and the SN are NR base stations gNBs. A DC manner in this case is referred to as the NR-NR DC.

To ensure communications security over an air interface, a key (key) used for communication between the UE and the MN is usually different from a key used for communication between the UE and the SN. For ease of description, the key used for the communication between the UE and the MN is referred to as a master key (master key. M-key), and the key used for the communication between the UE and the SN is referred to as a secondary key (secondary key, S-key). After accessing the MN, the UE obtains the M-key. Subsequently, the MN notifies the UE of a security parameter, so that the UE derives the S-key based on the security parameter and the M-key. The security parameter is a count value of an SN counter (counter). A specific name of the SN counter may be different in different DC manners. In addition, in the different DC manners, information elements of the SN counter may be different in a protocol, but a same function is implemented.

To ensure the communications security over the air interface, for same UE, when an S-key is derived from a same M-key, there is a need to ensure that an S-key obtained each time is different. However, in a possible case, the MN may successively configure two or more DC manners for the UE, and an SN counter in each DC manner is separately maintained and configured. When an M-key of the UE does not change, because each SN counter may be increased by 1 from 0 or 1 each time, the UE may use a same count value of the SN counter in the different DC manners. In this case, when the M-key is also the same, the UE derives a same S-key. Further, different SNs use the same S-key to communicate with the UE, affecting the communications security over the air interface.

This application further provides a communication method, to ensure communications security. The method may include the following two manners.

Manner 1: In different DC manners, an M-key of UE is fixed. When configuring different DC for the UE, an MN configures different count values of SN counters for the UE, to derive different S-keys.

Manner 2: In different DC manners, an MN staggers configurable value ranges of SN counters, to ensure that different count values of the SN counters are used in the different DC manners.

Figure 11:
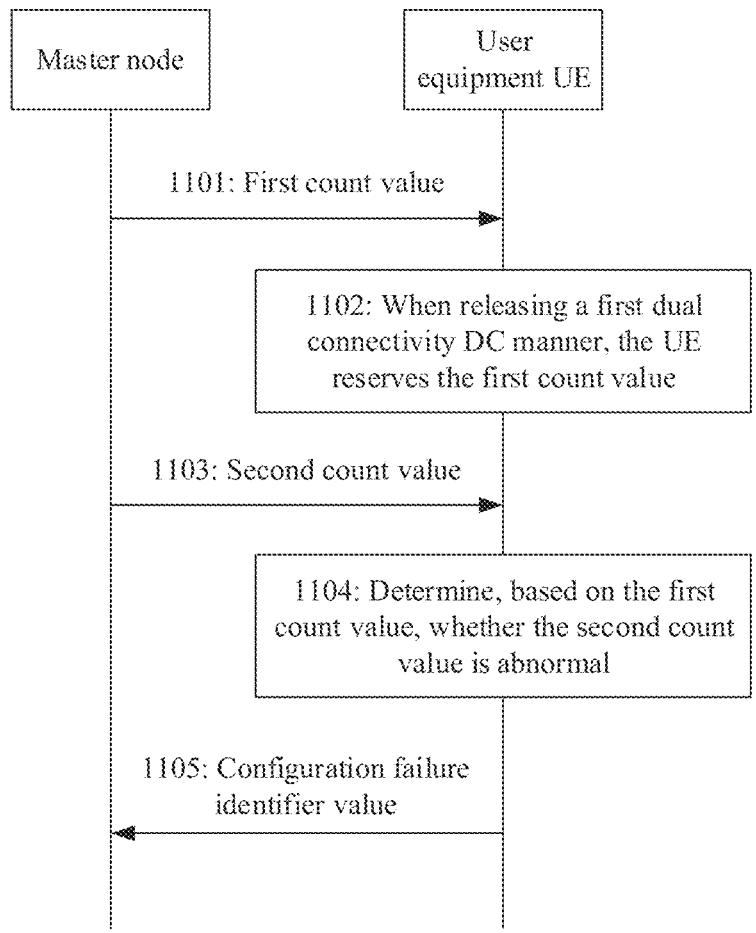
FIG. 11 is a schematic diagram of an embodiment of a key generation method in a DC scenario according to this application.

For the UE, to ensure that different SNs use different S-keys to communicate with the UE in the different DC manners, with reference to FIG. 11, the following method may be used.

1101: The UE receives a first count value sent by a master node MN, and the first count value is a count value of an SN counter when the MN configures a first DC manner for the UE.

When configuring the first DC manner for the UE, the MN sends the first count value of the SN counter to the UE, and the first count value is an integer greater than or equal to zero.

In this embodiment, the first DC manner is any one of long term evolution (long term evolution. LTE) DC, E-UTRA NR DC, NG EN-DC, NE-DC, and NR-NR DC, and is not specifically limited.

1102: When the UE releases the first DC manner, the UE reserves the first count value.

In this embodiment, that the UE releases the first DC manner indicates that the UE releases a configuration of a secondary node in the first DC manner. The configuration may be actively released by the UE, or the MN may indicate the UE to release the configuration in the first DC manner.

The configuration of the secondary node includes the first count value. However, when releasing the first DC manner, the UE does not delete the stored first count value corresponding to the first DC manner.

1103: The UE receives a second count value sent by the master node MN, and the second count value is a count value of an SN counter when the MN configures a second DC manner for the UE.

When configuring the second DC manner for the UE, the MN sends the second count value of the SN counter to the UE, and the second count value is an integer greater than or equal to zero.

In this embodiment, the second DC manner is a DC manner different from the first DC manner. The second DC manner is any one of LTE DC, E-UTRA NR DC, NG EN-DC, NE-DC, and NR-NR DC, and is not specifically limited.

1104: The UE determines, based on the first count value, whether the second count value is abnormal.

In this embodiment, that the UE determines, based on the first count value, whether the second count value is abnormal may be implemented in two manners, including:

1. The UE determines whether any count value in a count value set that is at a moment before the second count value is received is the same as the second count value, and the first count value belongs to the count value set. In this case, the UE needs to store each count value that is of the SN counter and that is configured by the MN.

If determining that the any count value in the count value set that is at the moment before the second count value is received is the same as the second count value, the UE determines that the second count value is abnormal. If determining that the any count value in the count value set that is at the moment before the second count value is received is not the same as the second count value, the UE determines that the second count value is normal.

2. If the first count value is a latest count value configured by the MN in a count value set that is at a moment before the second count value, because a count value of the SN counter is increased by 1 each time, all count values previously configured by the MN are less than or equal to the first count value. In this case, it may be determined, provided that the second count value is greater than the first count value, that the second count value is not used by the MN, and the second count value is normal. If the second count value is less than the first count value, the second count value is abnormal.

In this case, the UE needs to store only the latest count value that is of the SN counter that is configured by the MN.

For example, the MN first configures the LTE DC for the UE, and indicates that a count value of the SN counter is x1. The UE derives, based on an M-key and the count value x1, a first S-key used to communicate with a first SN. Then, the UE releases the LTE DC manner, and the UE deletes a configuration of the LTE DC. The configuration of the LTE DC includes the count value x1, but the UE does not delete the count value x1. Then, the MN configures the EN-DC for the UE, and indicates that a value of the SN counter is x2. The UE determines, based on x1, whether x2 is abnormal.

1105: When the second count value is abnormal, the UE sends configuration failure identification information to the MN.

The configuration failure identification information is sent in the following two manners.

The UE initiates a reestablishment procedure to establish a connection to the MN.

Optionally, after subsequent reestablishment succeeds, the UE reports the configuration failure identification information to the MN. A configuration failure cause may be an SN counter configuration failure or may be a DC configuration failure. Therefore, the configuration failure identification information may indicate a configuration failure, and may further indicate a specific configuration failure cause.

The MN determines the specific failure cause based on the configuration failure identification information, and reconfigures a count value of the SN counter for the UE.

2. The UE considers that an SCG configuration failure (failure) occurs, and sends a failure report to the MN.

Optionally, the configuration failure identification information is carried in the failure report, and a configuration failure cause may be an SN counter configuration failure or a DC configuration failure. Therefore, the configuration failure identification information indicates a configuration failure, and may further indicate a specific configuration failure cause.

Further optionally, the failure report does not include a measurement result, and the measurement result is a signal quality measurement result of at least one cell of a serving cell and a neighboring cell of the UE.

After subsequently receiving the failure report, the MN identifies the configuration failure identification information in the failure report, determines the specific failure cause based on the configuration failure identification information, and reconfigures a count value of the SN counter for the UE.

After step 1105, optionally, the MN may further send the reconfigured count value of the SN counter to the SN. Further optionally, the configuration failure identification information is sent to the SN.

In this embodiment, the UE determines, by using the first count value, whether the second count value is abnormal. If the MN configures a same count value, the UE sends the configuration failure identification information to the MN, to avoid a case in which the MN derives a same S-key in different DC manners. This ensures communications security over an air interface.

C: For a protocol, to ensure that different SNs use different S-keys to communicate with the UE in different DC manners, there are two implementations.

1. The MN allocates different count value value spaces of SN counters to the different DC manners by configuring a protocol, and the count value value spaces do not overlap each other.

2. The MN defines, by configuring a protocol, start points of count value value spaces of a plurality of SN counters.

When configuring a DC manner for the UE, the MN identifies whether another DC manner has been previously configured for the UE. If the another DC manner has been previously configured for the UE, a value staggering manner is used for configuration. For example, a new start point of a value space is selected.

In this embodiment, two or more of the foregoing three manners A. B, and C may be used in combination.

Figure 12:
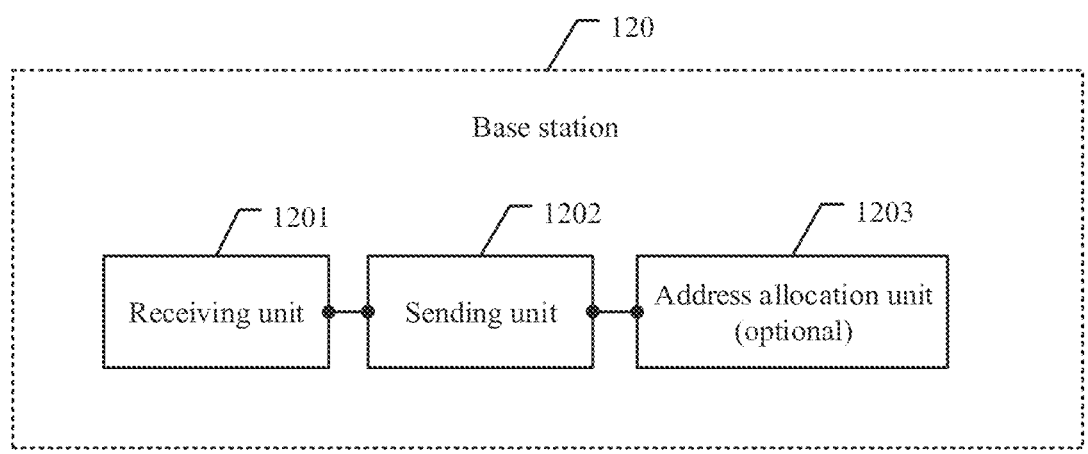
FIG. 12 shows a possible structure of a base station according to this application.

With reference to FIG. 12, a possible structure of a base station in this application is described.

A base station 120 includes:

a receiving unit 1201, configured to receive a handover request sent by a source base station, where the handover request includes first indication information, and the first indication information is used to indicate that a data radio bearer DRB corresponding to a quality of service flow QoS flow of the source base station changes from a first DRB to a second DRB; and a sending unit 1202, configured to send information about a tunnel to the source base station, where the tunnel is used by the target base station to receive a data unit sent by the source base station, and the data unit is a data unit obtained after the DRB corresponding to the QoS flow changes to the second DRB.

Optionally, that the first indication information is used to indicate that a data radio bearer DRB corresponding to a QoS flow received by the source base station changes from a first DRB to a second DRB includes:

the first indication information is used to indicate that the QoS flow received by the source base station from user equipment UE changes from being mapped to the first DRB to being mapped to the second DRB, and the QoS flow is a QoS flow that is buffered at a service data adaptation protocol SDAP layer of the source base station because the corresponding DRB changes; or the first indication information is used to indicate that the QoS flow sent by the source base station to UE changes from being mapped to the first DRB to being mapped to the second DRB, and the QoS flow is a QoS flow that is buffered at an SDAP layer of the source base station because the corresponding DRB changes.

Optionally, the receiving unit 1201 is further configured to: obtain an end indication, where the end indication is used to indicate an SDAP entity of the UE to stop mapping the QoS flow to the first DRB; and send the data unit to a core network device.

Optionally, the sending unit 1202 is further configured to: after the QoS flow mapped to the first DRB is received by the UE, send the data unit to the UE by using the second DRB.

Optionally, the information about the tunnel includes an identifier of a protocol data unit PDU session corresponding to the QoS flow.

Optionally, the receiving unit 1201 is further configured to receive second indication information from the source base station, and the second indication information is used by the target base station to determine that the data unit is a data unit that is buffered at the SDAP layer of the source base station because the corresponding DRB changes.

Optionally, the base station further includes:

an address allocation unit 1203, configured to allocate an address to the tunnel.

Optionally, the receiving unit 1201 is further configured to receive sequence number status transfer information from the source base station, and the sequence number status transfer information includes an SN number of the data unit.

Optionally, the SN number of the data unit is used by the target base station to determine that the data unit is a data unit that is buffered at the SDAP layer of the source base station because the corresponding DRB changes.

Figure 13:
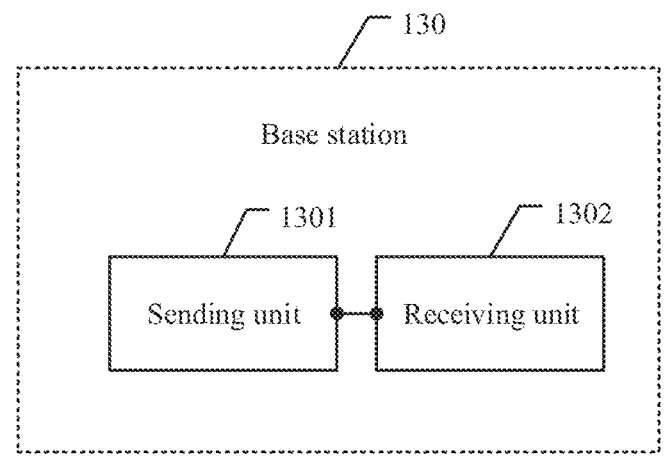
FIG. 13 shows another possible structure of a base station according to this application.

With reference to FIG. 13, another possible structure of a base station in this application is described.

A base station 130 includes:

a sending unit 1301, configured to send a handover request to a target base station, where the handover request includes first indication information, and the first indication information is used to indicate that a data radio bearer DRB corresponding to a quality of service flow QoS flow of the source base station changes from a first DRB to a second DRB; and a receiving unit 1302, configured to receive information about a tunnel sent by the target base station.

The sending unit 1301 is further configured to send a data unit to the target base station through the tunnel, and the data unit is a data unit obtained after the DRB corresponding to the QoS flow changes to the second DRB.

Figure 14:
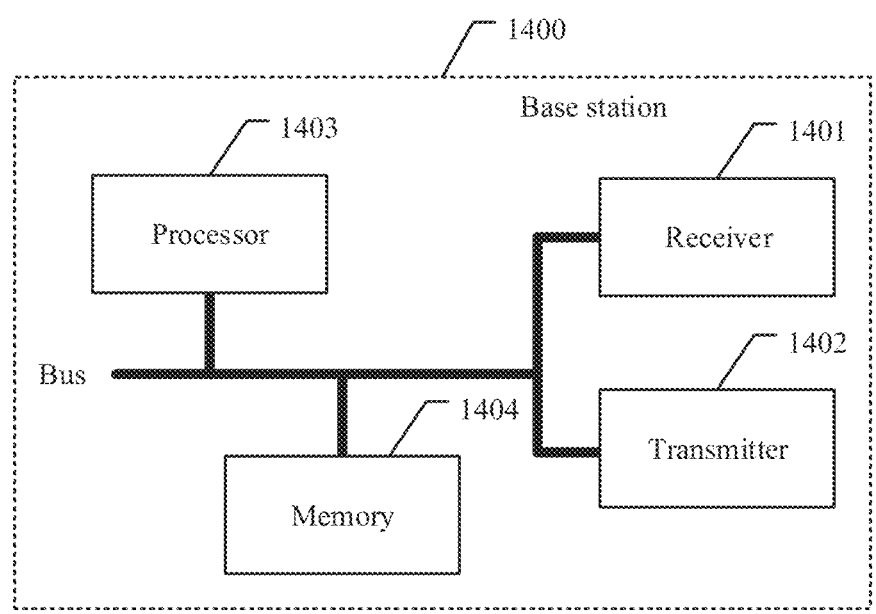
FIG. 14 shows another possible structure of a base station according to this application.

The following describes another base station provided in an embodiment of this application. With reference to FIG. 14, a base station 1400 includes:

a receiver 1401, a transmitter 1402, a processor 1403, and a memory 1404 (where there may be one or more processors 1403 in the base station 1400, and one processor is used as an example in FIG. 14). In some embodiments of this application, the receiver 1401, the transmitter 1402, the processor 1403, and the memory 1404 may be connected by using a bus or in another manner, and a connection by using the bus is used as an example in FIG. 14.

The memory 1404 may include a read-only memory and a random access memory, and provide an instruction and data to the processor 1403. A part of the memory 1404 may further include a non-volatile random access memory (English full name: non-volatile random access memory, NVRAM for short). The memory 1404 stores an operating system and an operation instruction, an executable module or a data structure, a subset thereof, or an extended set thereof. The operation instruction may include various operation instructions to implement various operations. The operating system may include various system programs, to implement various basic services and process hardware-based tasks.

The processor 1403 controls operations of a network device, and the processor 1403 may also be referred to as a central processing unit (English full name: central processing unit, CPU for short). In a specific application, components of the network device are coupled together by using a bus system. In addition to a data bus, the bus system may further include a power bus, a control bus, a status signal bus, and the like. However, for clear description, various types of buses in the figure are marked as the bus system.

The methods disclosed in the embodiments of this application may be applied to the processor 1403 or may be implemented by the processor 1403. The processor 1403 may be an integrated circuit chip and has a signal processing capability. In an implementation process, steps in the foregoing methods can be implemented by using a hardware integrated logical circuit in the processor 1403, or by using instructions in a form of software. The processor 1403 may be a general purpose processor, a digital signal processor (English full name: digital signal processing, DSP for short), an application-specific integrated circuit (English full name: application specific integrated circuit, ASIC for short), a field-programmable gate array (English full name: field-programmable gate array, FPGA for short) or another programmable logic device, a discrete gate or transistor logic device, or a discrete hardware component. The processor 1403 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1404, and the processor 1403 reads information in the memory 1404 and completes the steps in the foregoing methods in combination with hardware of the processor 1403.

The receiver 1401 may be configured to: receive input digit or character information, and generate signal input related to a related setting and function control of the network device. The transmitter 1402 may include a display device such as a display screen. The transmitter 1402 may be configured to output the digit or character information by using an external interface.

In this embodiment of this application, the processor 1403 is configured to perform the foregoing methods.

In addition, it needs to be noted that the described apparatus embodiment is merely an example. The modules described as separate parts may or may not be physically separate, and parts displayed as modules may or may not be physical units, may be located at one position, or may be distributed on a plurality of network units. Some or all the modules may be selected based on actual needs to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of this application.

The computer program product includes one or more computer instructions. When the computer program instructions are loaded and executed on the computer or the processor in the computer, all or a part of the procedures or functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A handover method, comprising:
   receiving, by a target access network device after a mapping relationship between a quality of service (QoS) flow of a terminal device and a data radio bearer (DRB) changes, a handover request from a source access network device, wherein the handover request comprises indication information for requesting to establish a tunnel;
   sending, by the target access network device to the source access network device, information about the tunnel for the target access network device to receive one or more data units from the source access network device after the mapping relationship between the QoS flow and the DRB changes, wherein the QoS flow maps to a first DRB before the mapping relationship changes and the QoS flow maps to a second DRB after the mapping relationship changes;
   obtaining, by the target access network device, an end indication indicating that a service data adaptation protocol (SDAP) entity of the terminal device stops mapping the QoS flow to the first DRB; and
   sending, by the target access network device, the one or more data units to a core network device.

2. The method according to claim 1, wherein the QoS flow maps to a first DRB before the mapping relationship changes and the QoS flow maps to a second DRB after the mapping relationship changes, and wherein the one or more data units are received by the source access network device by using the second DRB.

3. The method according to claim 1, wherein the method further comprises:
   receiving, by the target access network device from the source access network device, the mapping relationship between the QoS flow and the DRB before the mapping relationship between the QoS flow and the DRB changes.

4. The method according to claim 1, wherein the tunnel is a protocol data unit (PDU) session tunnel.

5. The method according to claim 1, wherein the information about the tunnel comprises an identifier of a protocol data unit (PDU) session corresponding to the QoS flow.

6. The method according to claim 1, wherein the method further comprises:
   before sending the information about the tunnel to the source access network device, allocating, by the target access network device, an address to the tunnel.

7. An apparatus, comprising:
   at least one processor coupled to a memory, the memory stores programming instructions instructing the at least one processor to perform operations comprising:
   receiving, after a mapping relationship between a quality of service (QoS) flow of a terminal device and a data radio bearer (DRB) changes, a handover request from a source access network device, wherein the handover request comprises indication information for requesting to establish a tunnel;
   sending information about the tunnel for the apparatus to receive one or more data units from the source access network device after the mapping relationship between the QoS flow and the DRB changes, wherein the QoS flow maps to a first DRB before the mapping relationship changes and the QoS flow maps to a second DRB after the mapping relationship changes;

obtaining an end indication indicating that a service data adaptation protocol (SDAP) entity of the terminal device stops mapping the QoS flow to the first DRB; and sending the one or more data units to a core network device.

8. The apparatus according to claim 7, wherein the QoS flow maps to a first DRB before the mapping relationship changes and the QoS flow maps to a second DRB after the mapping relationship changes, and wherein the one or more data units are received by the source access network device by using the second DRB.

9. The apparatus according to claim 7, wherein the operations further comprises: receiving, from the source access network device, the mapping relationship between the QoS flow and the DRB before the mapping relationship between the QoS flow and the DRB changes.

10. The apparatus according to claim 7, wherein the tunnel is a protocol data unit (PDU) session tunnel.

11. The apparatus according to claim 7, wherein the information about the tunnel comprises an identifier of a protocol data unit (PDU) session corresponding to the QoS flow.

12. The apparatus according to claim 7, further comprising a processing unit configured to allocate an address to the tunnel.

13. A communications system, comprising a source access network device and a target access network device, wherein the source access network device is configured to:

send a handover request to the target access network device, wherein the handover request comprises indication information for requesting to establish a tunnel, and a mapping relationship between a quality of service (QoS) flow of a terminal device and a data radio bearer (DRB) changes before the target access network device receives the handover request; and the target access network device is configured to:

send information about the tunnel for the target access network device to receive one or more data units from the source access network device after the mapping relationship between the QoS flow and the DRB changes, wherein the QoS flow maps to a first DRB before the mapping relationship changes and the QoS flow maps to a second DRB after the mapping relationship changes;

obtain an end indication indicating that a service data adaptation protocol (SDAP) entity of the terminal device stops mapping the QoS flow to the first DRB; and send the one or more data units to a core network device.

14. The system according to claim 13, wherein the QoS flow maps to a first DRB before the mapping relationship changes and the QoS flow maps to a second DRB after the mapping relationship changes, and wherein the one or more data units are received by the source access network device by using the second DRB.

15. The system according to claim 13, wherein the source access network device is further configured to send, to the target access network device, the mapping relationship between the QoS flow and the DRB obtained before the mapping relationship between the QoS flow and the DRB changes.

16. The system according to claim 13, wherein the tunnel is a protocol data unit (PDU) session tunnel.

17. The system according to claim 13, wherein the information about the tunnel comprises an identifier of a protocol data unit (PDU) session corresponding to the QoS flow.

* * * * *